US009969135B2

(12) United States Patent
Valeri et al.

(10) Patent No.: US 9,969,135 B2
(45) Date of Patent: May 15, 2018

(54) ADDITIVE MANUFACTURING FOR TRANSPARENT OPHTHALMIC LENS

(71) Applicant: ESSILOR INTERNATIONAL (COMPAGNIE GENERALE D'OPTIQUE), Charenton-le Pont (FR)

(72) Inventors: Robert A. Valeri, Dallas, TX (US); Steven Weber, Carrollton, TX (US); John Biteau, Dallas, TX (US)

(73) Assignee: ESSILOR INTERNATIONAL (COMPAGNIE GENERALE D'OPTIQUE), Charenton-le-Pont (FR)

(*) Notice: Subject to any disclaimer, the term of this patent is extended or adjusted under 35 U.S.C. 154(b) by 0 days. days.

(21) Appl. No.: 14/908,653

(22) PCT Filed: Jul. 31, 2013

(86) PCT No.: PCT/EP2013/002326
§ 371 (c)(1),
(2) Date: Jan. 29, 2016

(87) PCT Pub. No.: WO2015/014380
PCT Pub. Date: Feb. 5, 2015

(65) Prior Publication Data
US 2016/0167323 A1  Jun. 16, 2016

(51) Int. Cl.
G02C 7/02 (2006.01)
B29D 11/00 (2006.01)
(Continued)

(52) U.S. Cl.
CPC .... B29D 11/00432 (2013.01); B29C 67/0055 (2013.01); B29C 67/0088 (2013.01);
(Continued)

(58) Field of Classification Search
CPC .......... B29D 11/00432; B29C 67/0055; B29C 67/0088; B33Y 10/00; B33Y 80/00; B29L 2011/0016; G02C 7/022
(Continued)

(56) References Cited

U.S. PATENT DOCUMENTS 4,929,402 A   5/1990  Hull
8,348,423 B2  1/2013  Fermigier et al.
(Continued)

FOREIGN PATENT DOCUMENTS

CN           1591044 A      3/2005
DE   10 2008 009 332 A1     8/2009
(Continued)

OTHER PUBLICATIONS

Chinese Office Action issued in Application Serial No. 201380078566.X dated Oct. 27, 2016 with English Translation.
(Continued)

Primary Examiner — Tuyen Tra
(74) Attorney, Agent, or Firm — Young & Thompson

(57) ABSTRACT

A method using additive manufacturing technologies and processes to manufacture a three-dimensional ophthalmic lens with a high management level of the homogeneity during the construction of the ophthalmic lens, through a control of two technical characteristics of voxel: the ability to modify their viscosity, and the ability to inter-diffuse together to provide a final homogeneous element. These two technical characteristics are managed by the choice of component(s) used to manufacture each voxel and by the kind of physical and/or chemical treatment apply to each of them.

31 Claims, 3 Drawing Sheets

(51) Int. Cl.
*B29C 67/00* (2017.01)
*B33Y 10/00* (2015.01)
*B33Y 80/00* (2015.01)
*B29L 11/00* (2006.01)

(52) U.S. Cl.
CPC ........ *G02C 7/022* (2013.01); *B29D 11/00009* (2013.01); *B29L 2011/0016* (2013.01); *B33Y 10/00* (2014.12); *B33Y 80/00* (2014.12)

(58) Field of Classification Search
USPC ...................................... 351/159.01, 41, 900
See application file for complete search history.

(56) References Cited

U.S. PATENT DOCUMENTS

| | | |
|---|---|---|
| 2004/0008319 A1 | 1/2004 | Lai et al. |
| 2005/0088750 A1 | 4/2005 | Hasei |
| 2010/0321784 A1 | 12/2010 | De Oliveira et al. |

FOREIGN PATENT DOCUMENTS

| | | |
|---|---|---|
| JP | 2011-507011 A | 3/2011 |
| WO | 2006/029268 A1 | 3/2006 |

OTHER PUBLICATIONS

International Search Report, dated Apr. 24, 2014, from corresponding PCT application.
Japanese Office Action issued in Application Serial No. 2016-530354 dated Apr. 4, 2017 with English Translation.

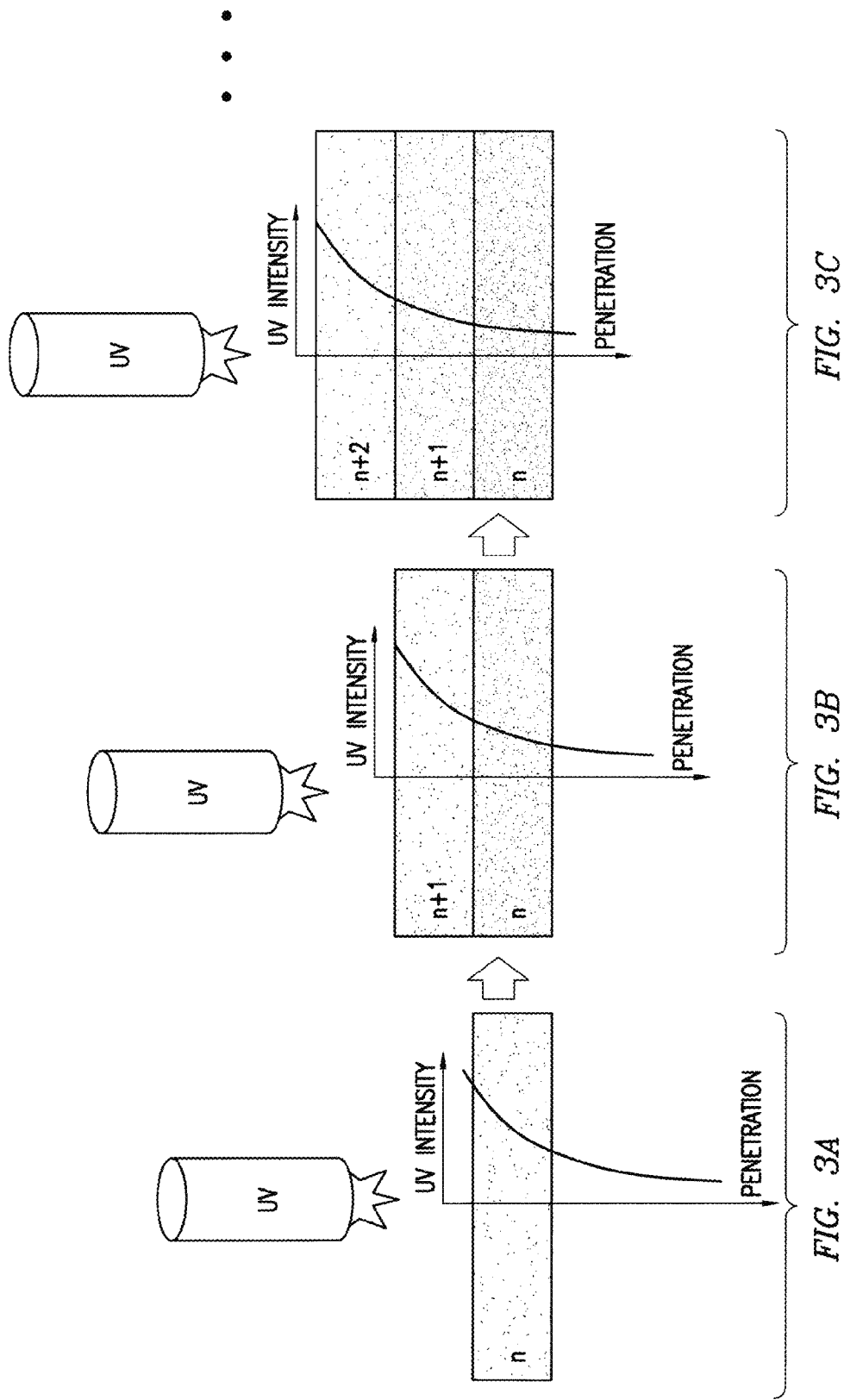

ADDITIVE MANUFACTURING FOR TRANSPARENT OPHTHALMIC LENS

TECHNICAL FIELD

The present invention relates to methods of manufacturing a three-dimensional transparent ophthalmic lens using additive manufacturing equipment.

BACKGROUND

Additive Manufacturing methods and devices have become well-known in various industries for production of parts and products formerly manufactured using subtractive manufacturing techniques, such as traditional machining. Application of such manufacturing methods has not been systematically applied.

By additive manufacturing it means a manufacturing technology as defined in the international standard ASTM 2792-12, which mentions a process of joining materials to make objects from 3D model data, usually layer upon layer, as opposed to subtractive manufacturing methodologies, such as traditional machining.

The additive manufacturing method may be selected in, but is not limited to, the list consisting of stereolithography, mask stereolithography or mask projection stereolithography, polymer jetting, scanning laser sintering or SLS, scanning laser melting or SLM, fused deposition modeling or FDM.

Additive manufacturing technologies comprise processes which create objects by juxtaposition of volume elements according to a pre-determined arrangement that can be defined in a CAD (Computer Aided Design) file. Such juxtaposition is understood as the result of sequential operations such as building a material layer on top of a previously obtained material layer and/or juxtaposing a material volume element next to a previously obtained volume element.

It is well known by the man skilled in the art that the determination of the voxels geometries and locations is the result of an optimized construction strategy that may take into account the order of the sequential manufacturing operations as related to the capabilities of the chosen additive manufacturing equipment.

The optimized construction strategy typically comprises:
the determination of the geometries and locations of voxels
the determination of the geometries and locations of slices made of a plurality of voxels,
the determination of the orientation of the global arrangement of voxels and/or slices in the referential of the additive manufacturing equipment(s).
the determination of the order according to which the voxels and/or slices are to be manufactured.

A 3D printing device that may be used for the invention is adapted to juxtapose small elements of volume, also referred to as voxel, to build an ophthalmic lens. Furthermore, the 3D printing device may be adapted to lay down successive layers of liquid, powder or sheet material from a series of cross sections. These layers, which correspond to the virtual cross sections from the digital model, are polymerized or joined together or fused to create at least part of the optical equipment.

The primary advantage of this technique is its ability to create almost any shape or geometric feature. Advantageously, using such additive manufacturing methods provides much more freedom during the determining step.

One disadvantage of these techniques is that the object is manufactured using a plurality of element, and then it could be difficult to manage the homogeneity of the final product. This represents a main issue to use this technology to manufacture a transparent ophthalmic lens and more particularly ophthalmic lenses. Indeed ophthalmic lenses should be transparent to respond to the need of a wearer. To be transparent it means that the object manufactured should be homogeneous and without any diffusion.

Within the terms of reference of the invention, an ophthalmic lens is understood to be transparent when the observation of an image through said ophthalmic lens is perceived with no significant loss of contrast, that is, when the formation of an image through said ophthalmic lens is obtained without adversely affecting the quality of the image. This definition of the term "transparent" can be applied, within the terms of reference of the invention, to all objects qualified as such in the description.

Using an additive manufacturing process to manufacture an ophthalmic lens from discrete voxels increases the risk of formation of some defect which could be generated either by a poor homogenization between at least two voxels or by a different level of polymerization inside each voxel due to a bad control of reactivity and mobility of reactive species comprised in said voxel. Then these defects could interact with the light by diffracting it. Diffraction is defined as the light spreading effect that is observed when a light wave is physically limited (J-P. PEREZ—Optique, Fondements et applications 7th edition—DUNOD—October 2004, p. 262). Thus, an ophthalmic lens including such defects transmits an image that is degraded because of this spreading of the light induced by said defects. The microscopic diffraction macroscopically results in diffusion. This macroscopic diffusion or incoherent diffusion results in a diffusing halo and, therefore, in a loss of contrast of the image observed through said structure. This loss of contrast can be likened to a loss of transparency, as defined previously. This macroscopic diffusion effect is unacceptable for the production of an ophthalmic lens. This is all the more so in the case where said ophthalmic lens is an ophthalmic lens, which needs on the one hand to be transparent, according to the meaning defined previously, and, on the other hand, to have no cosmetic defect that can hamper the vision of the wearer of such an ophthalmic lens.

By nature and directly linked to the principle of assembling discrete volume elements, additive manufacturing technologies raise difficulties to manage the bulk homogeneity of the final product. This is particularly striking a problem when one considers manufacturing ophthalmic lens for applications in the visible range. Due to the typical size of voxels considered, typically in the range of 0.1 to 500 micrometers, the objet resulting from an additive manufacturing processes tends to show refractive index variations on a scale which generates scattering (in other terms haze or diffusion) in possible combination with optical distortion. It is therefore a key issue for optical applications to be able to produce parts with sufficient homogeneity in the bulk and sufficient smoothness at the surface not to alter the propagation of light rays and hence minimize scattering phenomena which induce a detrimental loss of contrast.

In addition, the physical constitution of voxels in additive manufacturing technologies classically uses physical means which induce geometry variations for the voxels along the fabrication process. Those physical means can be light induced polymerization and/or thermal management which typically generate dimensional shrinkage at the scale of individual voxels, and also macroscopic stress building at the scale of the object produced by the additive manufacturing process.

As far as optical applications are concerned, these above-described dimensional changes during the manufacturing process, either resulting from dimensional changes at the individual voxel scale or from a collective effect linked to voxel assembling, such as stress build up, directly impact the optical characteristics of the final object and its ability to modify an optical wavefront propagation in a controlled and deterministic fashion across the whole transverse section of a beam being transmitted through a lens. For ophthalmic lenses, such dimensional changes alter the final prescription associated with said ophthalmic lenses and which should be individualized to a particular wearer.

The term "prescription" is to be understood to mean a set of optical characteristics of optical power, astigmatism, prismatic deviation, and, where relevant, of addition, determined by an ophthalmologist or optometrist in order to correct the vision defects of the wearer, for example, by means of a lens positioned in front of the wearer's eye. For example, the prescription for a progressive addition lens (PAL) comprises values of optical power and of astigmatism at the distance-vision point and, where appropriate, an addition value. The prescription data may include data for emmetropic eyes.

It is therefore another key issue for ophthalmic applications to be able to produce an object by additive manufacturing with a sufficient control of the individual and collective voxel geometries so as to deliver a final product whose geometries is in direct relationship with the geometry associated to the initial CAD file The present invention describes a method to solve this problem by manufacturing a three-dimensional ophthalmic lens with a high management level of the homogeneity during the construction of the ophthalmic lens, through a control of two technical characteristics of the voxel:

the ability to modify their viscosity, the ability to inter-diffuse together to provide a final homogeneous element.

These two technical characteristics are managed by the choice of component(s) used to manufacture each voxel and by the kind of physical and/or chemical treatment applied to each of them.

In the present invention voxels viscosity levels are controlled along the process sequence so as to manage the inter-diffusion potential of relevant chemical species embedded in the voxels formulation.

The fact that we use viscosity as a key parameter to control the ability of embedded chemical species to inter-diffuse is particularly interesting. The combined control of viscosity and inter-diffusion potential makes a wide range of monomeric and/or oligomeric material formulations accessible for an additive manufacturing production scheme aimed at fabricating transparent homogenous parts

SUMMARY OF THE INVENTION

The present invention proposes a method of manufacturing a transparent ophthalmic lens with a high management level of homogeneity through control of technical characteristics of the voxel, including, modification of viscosity, improvement of ability to inter-diffuse with adjacent voxels, and homogeneity of the final ophthalmic lens. These technical characteristics are managed by choice of materials used to manufacture voxels and by the physical, chemical, or other treatment applied to them. The methods enable manufacturing of transparent ophthalmic lens using Additive Manufacturing by providing for geometric fidelity of voxels and bulk homogeneity of the ophthalmic lens.

Generally, a method of Additive Manufacturing is provided wherein the viscosity of the voxel material is increased at deposition. Due to the increase in viscosity, the deposited voxel tends to remain in location at the deposition site and maintain the selected voxel geometry. At a later time, juxtaposed voxels inter-diffuse such that separate, discrete voxels merge to create a homogenous solid object. Post-processing after voxel inter-diffusion is possible as well.

More particularly, a homogeneous, 3-D solid object comprising a transparent ophthalmic lens like an ophthalmic lens for example is created by Additive Manufacturing. The Additive Manufacturing device, such as a 3-D printer for example, deposits one or more voxels of liquid composition having at least one monomer and/or oligomer therein. The method further includes two or more treatments or processes applied to the monomer and/or oligomer after deposition: a treatment to increase the viscosity of the deposited voxel; and a treatment to promote inter-diffusion of juxtaposed voxels. The inter-diffused voxels are then polymerized. The disclosure presents a method of manufacture using a composition selected such that an increase in viscosity can be induced after voxel deposition, followed by spontaneous or induced voxel inter-diffusion of at least one of the components of the composition.

After deposition of a first voxel (or group of voxels), a first treatment increases the viscosity of the voxels such that they substantially remain where deposited and have sufficient cohesion to support later-deposited voxels. After deposition of a second voxel (or group of voxels), monomer and/or oligomer from the first voxel (or group of voxels) diffuse into the second voxel (or group of voxels) either spontaneously or under application of a second treatment. The second treatment can optionally polymerize or increase the viscosity of the resulting combination of voxels. These steps can be repeated for several sequential depositions. An optional, final treatment, such as photo-polymerization, can occur after each deposition of the voxels.

Therefore, in a first embodiment, an object of the present invention is to provide a method of manufacturing a three-dimensional transparent ophthalmic lens comprising the following steps:

/1/ constituting at least a voxel of a liquid composition (A) in a state 1a;

/2/ constituting at least a voxel of a liquid composition (B) in a state 1b;

/3/ increasing viscosity of at least a said constituted voxel to reach it from a state 1 to a state 2;

/4/ inter-diffusing through a physical and/or a chemical treatment, at least a voxel wherein viscosity is increased, either of a composition (A) to a state 2a or a composition (B) to a state 2b, with another voxel either of a composition (A) in a state 1a or 2a, or of a composition (B) in a state 1b or 2b, to create an intermediate element (n);

/5/ repeating, (X) times, at least one of the steps selected from /1/, /2/, /3/ and /4/ to form a homogeneous intermediate element (n+(X)) until a three-dimensional transparent ophthalmic lens is obtained, and when at least two steps from said steps are repeated, said at least two steps may be repeated in the same order as cited or in a different order according to chemical compound(s) involved to said liquid composition (A) and said liquid composition (B); and /6/ optionally applying at least a post-treatment after at least one step selected from step /3/, /4/ and /5/ to improve homogenization of at least one of the intermediate element from (n) to (n+(X)) and/or of the transparent ophthalmic lens.

It is also an object of the invention to provide a method of manufacturing a three-dimensional transparent ophthalmic lens comprising the following steps:

/1/ constituting a first voxel of a liquid composition (A) in a state 1a;

/2/ constituting a new voxel, adjacent to said first voxel, of a liquid composition (B) to a state 1b;

/3/ increasing viscosity of said first voxel and said new voxel to reach them respectively to a state 2a and to a state 2b;

/4/ inter-diffusing said first voxel and said new voxel, by submitting them to a physical and/or chemical treatment, to create an intermediate element (n) in a state 3 by merging the two voxels;

/5/ repeating, (X) times, steps /2/ to /4/ respectively by applying said steps "increasing viscosity" and "inter-diffusing" to each new voxel and to intermediate element to form an intermediate element (n+(X)) until a three-dimensional transparent ophthalmic lens is obtained; and /6/ optionally applying at least a post-treatment after at least one step selected from step /3/, /4/ and /5/ to improve homogenization of intermediate element(s) from (n) to (n+(X)) to provide the transparent ophthalmic lens.

It is a further object according to another embodiment of the invention to provide a method of manufacturing a three-dimensional transparent ophthalmic lens according to the first embodiment wherein:

step /3/ is performed between steps /1/ and /2/ and is then applied to the first voxel of a liquid composition (A) in a state 1a; and comprising further a step /3A/ increasing viscosity after step /4/ and applying to intermediate element which is the result of step /4/.

In accordance with the invention it is understood that in the various embodiments:

liquid composition (A) and liquid composition (B) are identical or different; and each new voxel may be comprised either a liquid composition (A) or liquid composition (B), or alternatively a liquid composition (A) then a liquid composition (B).

More particularly the two following embodiments may represent an advantageous implementation of the invention:

Wherein in during step /5/, each new voxel comprises alternatively a liquid composition (A) and a liquid composition (B), and wherein liquid composition (A) and liquid composition (B) are different.

Wherein in during step /5/ each new voxel comprises a liquid composition (A), and wherein liquid composition (A) in the step /1/ and liquid composition (B) in the step /2/ are identical.

Increasing viscosity step(s) can be achieved by processes such as:

a crosslinking process, which could be initiate by cationic reaction, by free radical reaction or by condensation reaction by applying activating light or thermal treatment to liquid composition;

an evaporation process, and more particularly evaporation of solvent comprised into liquid composition; and a process consisting to submit liquid composition to a temperature which is below the temperature used at the deposition step of the voxel.

It is an embodiment of the invention, wherein each step of increasing viscosity in a method may be identical or different.

Inter-diffusing step(s) can be promoted by processes selected from:

a spontaneous inter-diffusion; and an induced inter-diffusion, which represent a process selected from the group consisting of exposure to radiation, mechanical agitation, decrease of molecular mass of voxel, and exposure to a solvent.

Exposure to radiation may be realized for example, through heating, heated convection, infra-red heating, microwave. Decreasing of molecular mass of voxel is principally obtained through reversible chemical reactions such as, for example, Diels-Alders, hydrogen bonding, or chelation.

It is anticipated that successful spontaneous inter-diffusion requires the voxel composition be below a specific viscosity at ambient or laboratory conditions to result in "fast-enough" diffusion between juxtaposed voxels for desirable mechanical and optical properties to be achieved. There is the same requirement for inter-diffusion between voxel and intermediate element or between intermediate element(s).

In accordance with this herein before embodiment it is understood that each step of inter-diffusing is identical or different.

It is also an object of the invention, wherein post-treatment step(s) is selected from process:

a crosslinking process, which could be initiated by cationic reaction, by free radical reaction or by condensation reaction by applying activating light or thermal treatment to liquid composition;

an annealing process; and a drying process by thermal treatment or solvent extraction.

In accordance with this herein before embodiment it is understood that each step of post-treatment is identical or different.

In accordance with the method of the present invention the step of increasing viscosity is able to increase the initial viscosity of the liquid composition from 5 times to 20 times, the final viscosity of the ophthalmic lens manufactured by said method being more than 50 000 cPs at 25° C.

Relating "increasing viscosity" step(s), to an embodiment of the invention this step comprised a crosslinking process represents a photo-polymerization or a thermal-polymerization process wherein the liquid composition comprises:

at least a monomer and/or oligomer comprising at least a reactive group selected from epoxy, thioepoxy, epoxysilane, (meth)acrylate, vinyl, urethane, thiourethane, isocyanate, mercapto, and alcohol, and preferentially selected from epoxy, epoxysilane, and (meth)acrylate; and at least an initiator being able to be activated by activating light or activating temperature, said initiator being selected from cationic initiator and free-radical initiator; and wherein activated initiator being able to initiate activation of at least one reactive group from monomer and/or oligomer to generate their polymerization reaction via propagation process.

Concerning liquid composition(s) implemented to constitute a voxel, the method comprises an embodiment, wherein the liquid composition (A) and (B) comprised:

at least a mixture of two monomers and/or oligomers each of them comprising different reactive groups wherein at least a reactive group of the first monomer and/or oligomer is able to increase its viscosity by a photo-polymerization process and a reactive group of the second monomer is able to increase its viscosity by a photo-polymerization process or by a thermal-polymerization process; and at least a mixture of two initiators, the first initiator being able to activate the at least a reactive group of said first monomer by treatment of activating light, the second initiator being able to activate the at least a reactive group of said second monomer by thermal treatment or by activating light treatment which is different than previous activating light.

According to the invention, there is another embodiment, wherein steps of constituting voxels comprises a step of constituting alternatively voxels based of two different liquid compositions (A) and (B):

a liquid composition (A) comprising at least a monomer and/or oligomer with two families of reactive groups, one family being able to be activated by photo-polymerization in the presence of a photo-initiator, preferentially selected from a cationic photo-initiator;

a liquid composition (B) comprising at least same monomer and/or oligomer of said first composition and an initiator which is different than said first photo-initiator and is able to be activated by photo-polymerization or by thermal-polymerization.

In a preferred way, the herein above embodiment is such that said liquid composition (B) comprises a photo-initiator being able to be activated by photo-polymerization said photo-initiator being:

either a cationic initiator which is activatable by irradiation to a different wavelength and/or intensity of activating light than activating light used to activate the initiator of the liquid composition (A);

or a free-radical initiator;

said photo-initiator being preferentially a free-radical initiator.

In another embodiment in accordance with the invention, the method is such that:

the step of constituting a voxel comprises the use of:

either a liquid composition comprised at least a monomer and/or oligomer comprising at least a reactive group selected from epoxy, thioepoxy, (meth)acrylic, and (meth)acrylate, at least a cationic initiator or a free-radical initiator, and a solvent or mixture of solvent;

or the liquid composition represents a thermoplastic polymer dissolved in an solvent;

and step of increasing the viscosity comprises an evaporation process which is done after each step of constituting a voxel of liquid composition to create stable voxels.

It is also an embodiment of the invention wherein the method comprising the following steps:

a—a step of constituting a first voxel wherein the liquid composition (A) represents a thermoplastic polymer dissolved in a solvent in a state 1a;

b—a step of increasing viscosity by an evaporation process to end-up said voxel as a stable voxel of liquid composition (A) to a state 2a;

c—a step of constituting a new adjacent voxel of a liquid composition (B), identical to said liquid composition (A), to a state 1b;

d—a step of inter-diffusing by spontaneous diffusion of said new voxel to said first voxel, to create an intermediate element (n);

e—a step of increasing viscosity by an evaporation process to end-up said intermediate element (n) as a stable element;

f—a step of repeating X times, steps b to e, until the constitution of an intermediate element (n+(X));

g—a post-treatment step, like heating by convection or using infra-red irradiation, being applied to enhance homogenization inside said intermediate element (n+(X)) and to produce a three-dimensional transparent ophthalmic lens.

It is also an embodiment of the invention wherein the method comprising the following steps:

constituting a first voxel of liquid composition (A) comprising a mixture of at least: a) an epoxy or thioepoxy monomer and/or oligomer, or an acrylic or (meth) acrylic monomer and/or oligomer, b) a solvent or mixture of solvent c) and a photo-initiator selected preferentially from cationic initiator for epoxy or thioepoxy monomer and/or oligomer, and from free-radical initiator for acrylic and (meth)acrylic monomer and/or oligomer, in a state 1a;

increasing the viscosity by evaporating a sufficient amount of the solvent, resulting in a stable first voxel, in a state 2a and to substantially maintain its geometry during later steps;

repeating x times the two first preceding steps with new voxels up to a desired amount;

inter-diffusing the plurality of deposited voxels either by a spontaneous inter-diffusion or by a thermal diffusion process by heat convection or infra-red radiation up to constitute an intermediate element (n+x) which represents part of the transparent ophthalmic lens;

repeating (X−x) times all preceding steps with new voxels up to constitute of an intermediate element (n+(X));

applying a post-treatment process by UV activating light to cure said intermediate elements to obtain the three-dimensional transparent ophthalmic lens.

It is also an object of the invention a method, wherein the three-dimensional ophthalmic lens is manufactured by an additive manufacturing technology selected from stereolithography, mask stereolithography, mask projection stereolithography, polymer jetting, and fused deposition modeling.

The three-dimensional transparent ophthalmic lens manufactured by a method in accordance of any previous embodiments may further be treated to obtain an ophthalmic lens with at least one added value. Then in accordance with this, the invention comprises a method comprising further step(s):

adding at least a functional coating and/or a functional film, on at least one face of the ophthalmic lens;

the functionality of said coating and/or said film being selected from anti-impact, anti-abrasion, anti-soiling, anti-static, anti-reflective, anti-fog, anti-rain, self-healing, polarization, tint, photochromic, and selective wavelength filter which could be obtain through an absorption filter or reflective filter;

said functionality may be added by at least one process selected from dip-coating, spin-coating, spray-coating, vacuum deposition, transfer process or lamination process.

The three-dimensional transparent ophthalmic lens, manufactured in accordance with an embodiment of the present invention, represents an ophthalmic lens selected from blank lens, semi-finished lens, and finished lens, Said three-dimensional transparent ophthalmic lens, may also represent a lens selected from afocal, unifocal, bifocal, trifocal, and progressive lens, said ophthalmic lens being able to be mounted either to traditional frame comprising two distinctive ophthalmic lenses, one for the right eye and one for the left eye, or to mask, visor, helmet sight or goggle, wherein one ophthalmic lens facing simultaneously the right and the left eyes, and said ophthalmic lens may be produced with traditional geometry as a circle or may be produced to be fitted to the geometry to the frame intended.

Three-dimensional transparent ophthalmic lens obtained from a method of at least one mentioned embodiment is also an object of the present invention.

More details relating to the various embodiments of the invention will be described in the detailed description part of the invention, without any limitation to the general method described hereinbefore.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIG. 3 represents a specific embodiment of the invention wherein stereolithography represents a particularly relevant technology to implementing this embodiment.

DETAILED DESCRIPTION OF THE PREFERRED EMBODIMENTS

Figure 1:
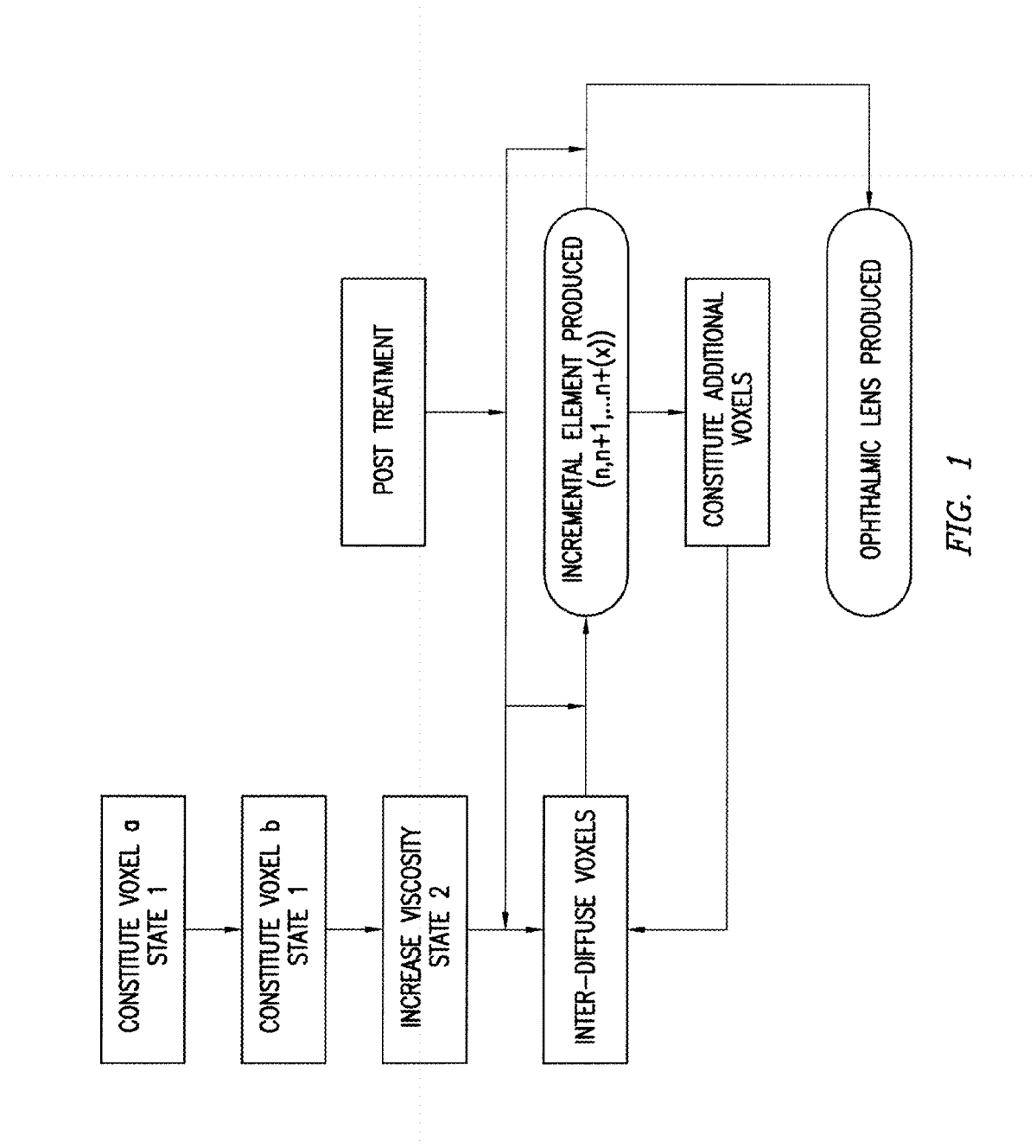
FIG. 1 is a flowchart regarding the first embodiment of the present invention
Figure 2:
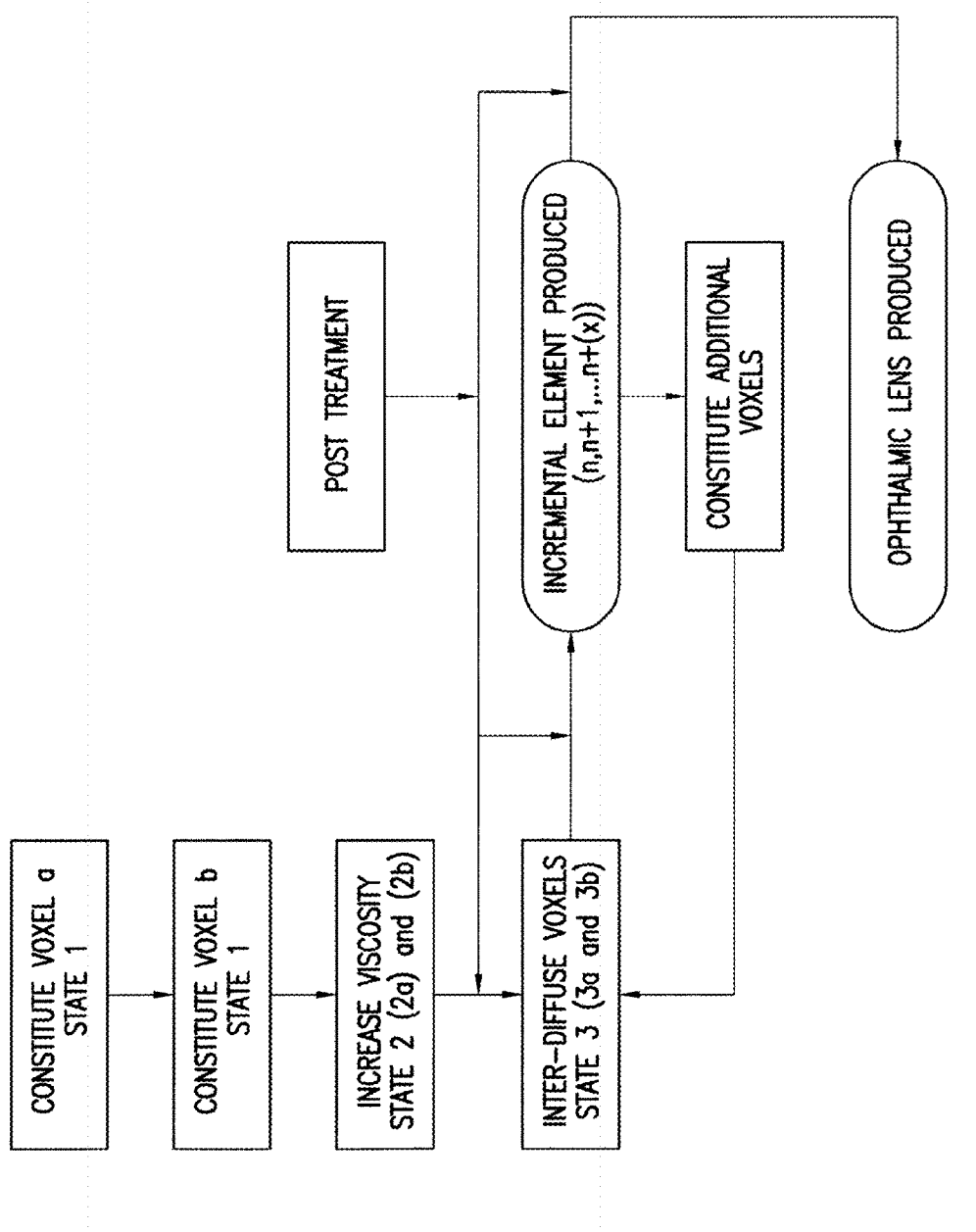
FIG. 2 is a flowchart regarding one specific embodiment.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

As used herein, "Additive Manufacturing" means manufacturing technology as defined in the international standard ASTM 2792-12, describing a process of joining materials to make 3-D solid objects from a 3-D digital model. The process is referred to as "3-D printing" or "materials printing" since successive layers are laid down atop one another. Printing materials include liquids, powders, and sheet materials, from which series of cross-sectional layers are built. The layers, which correspond to the virtual cross sections from the CAD model, are joined or automatically fused to create the solid 3-D object. Additive Manufacturing includes, but is not limited to, manufacturing methods such as stereolithography, mask stereolithography, mask projection stereolithography, polymer jetting, scanning laser sintering (SLS), scanning laser melting (SLM), and fused deposition modelling (FDM). Additive Manufacturing technologies comprise processes which create 3-D solid objects by juxtaposition of volume elements or particles according to a pre-determined arrangement, typically defined in a CAD (Computer Aided Design) file. Juxtaposition is understood as sequential operations including building one material layer on top of a previously built material layer, and/or positioning a material volume element next to a previously deposited material volume element.

One such additive manufacturing method employs a printer head such as in an ink jet or polymer-jet printer that deposits discrete units (voxels) of a composition onto a substrate or previously deposited voxel. The voxels are typically deposited as layers, with successive layers interdiffused and converted to a geometrically stable voxel composition. In jet printing a critical step is maintaining voxel shape. The voxel shape is then converted to a solid by UV or thermal curing, for example. These printing processes are particularly compatible with the liquid compositions described herein.

Another method involves a pool or bath of polymerizable or curable liquid. A selected cross-section of a layer of the liquid is cured, such as by exposure to UV radiation. An additional layer of the curable liquid is then constituted or deposited onto the first layer, and the process is gradually repeated, building-up the desired three-dimensional solid element. This technology is well known as stereolithography and its derivatives.

As used herein, "homogeneity" refers to the absence in a bulk lens material, of any variation of refractive index of the material that could induce noticeable scattering, haze, diffraction, distortion, and/or striation in the visible spectral range. In particular, homogeneity refers to a bulk lens material comprising voxels constituted from the same or different liquid composition, each voxel showing the same final degree of polymerization.

As used herein, a "state," such as "state 1a," "state 2a," "first state," etc., refers to the chemical composition and physical properties of the referenced composition. For example, reference can be made to a "state 1a" of a liquid composition (A), which is liquid for use in an Additive Manufacturing machine, and then to a more viscous "state 2a" after the viscosity of composition has been (partially or fully) increased. There is the same understanding for a liquid composition (B) going from a "state 1b", to a "state 2b".

As used herein, "voxel" means a volume element. A voxel is a distinguishable, geometric shape which is part of a three-dimensional space. As used herein, "voxel" can refer to an individual element which, in combination with other voxels, defines an intermediate element which could be a layer of within the space. Additionally, the term "voxel," as used herein, can apply to an intermediate element which is part of the three-dimensional space. That is, a single voxel can comprise a layer of the three-dimensional space, more particularly when the additive manufacturing technology used is based on stereolithography technologies. A particular voxel may be identified by x, y, and z coordinates of a selected point of geometry of the shape, such as a corner, centre, etc., or by other means known in the art.

As mentioned hereinbefore, the present invention comprises 3 mains actions, apply to a liquid composition to manufacture a 3D transparent ophthalmic lens, as the following:

A/ Increase viscosity
B/ Voxel inter-diffusion
C/ Post treatment which could be optional.

In accordance with the invention, and depending on the additive manufacturing technology implementation, said three mains actions may be achieved voxel-to-voxel, line-to-line, layer-by-layer, and/or after all desired layers have been formed to produce said three-dimensional transparent ophthalmic lens.

We will describe now more details of embodiment for each main step of the method according to the invention.

The step consisting to increase the voxel viscosity comprises a double objective: firstly to maintain the integrity and the geometry of each voxel created during the method, to guarantee that each voxel represents a three dimensional object. This characteristic is mandatory to be able to control the geometry of the final 3D ophthalmic lens.

According to the nature of reactive species that comprises the liquid composition used to constitute each voxel, the present invention comprises two mains approaches relating to the step consisting to increase the viscosity:

one approach (Approach 1) consist to increase partially the viscosity of voxel or intermediate element, to guarantee its three-dimensional integrity and also maintain a certain level of mobility of reactive species comprised to the liquid composition. The mobility of reactive species depends on its charge and its size, but also the environment in which it operates, and the viscosity thereof. This approach will be detailed later in the specification. Nevertheless we can note that this first approach is particularly advantageous when we used in accordance with the present invention, a method wherein various voxels comprised liquid composition that are different, and/or wherein the increasing of the viscosity is managed by a cross-linking process;

a second approach (Approach 2) consist to increase the viscosity of voxel close to the viscosity of solid state of the liquid composition, to guarantee firstly the 3D integrity of such voxel. This approach will be detailed later in the specification. Nevertheless we can note that this second approach is particularly advantageous when we used in accordance with the present invention, a method wherein the increasing of the viscosity is managed by an evaporation process. In this present case, a final post-treatment is advantageously required.

A/ Increase Viscosity:

As used herein, "viscosity" refers to a fluid's resistance to deformation. Liquid composition, suitable for use in an Additive Manufacturing device, in accordance with the invention, typically presents a viscosity comprised from 40 to 100 cPs at 25° C.; When liquid composition comprised thermoplastic polymer in place of monomer and/or oligomer the initial viscosity could be higher until 1500 cPs at 25° C. The viscosity between liquid composition when a voxel is constituted and after the step of increasing the viscosity could be increased from 5 times to 20 times.

The viscosity of the ophthalmic lens manufactured by a method of the invention corresponds to the solid state of said ophthalmic lens, which is typically more than 50 000 cPs at 25° C.

In the present invention, the wording "constitutes a voxel" and its derivatives could be understood like:

deposit a droplet of liquid composition to a substrate, through an inkjet head of an ink-jet printer; in this case the additive manufacturing technology used is polymer jetting and the droplet represents a voxel.

apply a liquid composition as a thin layer to a surface of a bath and perform selective polymerization of said composition; in this case the additive manufacturing technology used is stereolithography [stereolithography, mask stereolithography or mask projection stereolithography] and the layer represents a voxel.

deposit of liquid composition as a melted wire to a surface; in this case the additive manufacturing technology is fused deposition modelling or FDM.

In an embodiment of the invention, the method to manufacture a three-dimensional ophthalmic lens represent a method wherein the step consisting to increase the viscosity of voxel or intermediate elements comprises a step selected from cross-linking of reactive species of the liquid composition, evaporating at least a portion of solvent of the liquid composition, and decreasing the temperature of said obtained composition of sequentially deposited voxels. Evaporating solvent could be notably obtained by vacuum, by heating, or by extraction. One preferred manner in accordance with additive manufacturing technology, is to evaporate solvent by heating, like convection heating, infrared heating, these two kinds of processes being very able to be applied in a specific localized area, this area may correspond to a voxel for example.

As used herein, polymerization/polymerizing/polymerizable refers to a chemical reaction that produces bonding of two or more monomers and/or oligomers to form a polymer. Polymerization and all grammatical variations include photo-polymerizable and/or thermo-polymerizable compositions. Photo-polymerizable means polymerization which occurs by exposing a composition to activating light. Thermo-polymerizable means polymerization which occurs by exposing the composition to a variation of temperature.

As used herein, curing refers to a chemical process of converting a monomer or a oligomer into a polymer of higher molar mass and then into a network.

As used herein, a "liquid composition" refers to a mixture of compounds comprising at least a monomer and/or oligomer and at least an initiator.

As used herein, "monomer" and/or "oligomer" refer to a chemical compound comprising at least a reactive group able to react to activating light, and/or temperature in the presence of an initiator. More details relating to "reactive group" being involved will be described latter in the present specifications.

As used herein "activating light" refers to actinic radiation and visible light. Activating light may affect a chemical change. Activating light may include ultraviolet light (e.g., light having a wavelength between about 300 nm to about 400 nm), actinic light, visible light or infrared light. Generally, any wavelength of light capable of affecting a chemical change may be classified as activating. Chemical changes may be manifested in a number of forms. A chemical change may include, but is not limited to, any chemical reaction that causes a polymerization to take place.

As used herein, an initiator represents a photo-initiator or a thereto-initiator.

A photo-initiator represents a molecule employed alone or in a chemical system (involving two or more molecules) that absorbs light and forms reactive initiating species. Then by absorption of light, a photo-initiator generates reactive species (ion or radical) and initiates a chemical reaction or transformation.

As used herein, a co-initiator represents a molecule as part of a chemical system which does not absorb light but, nevertheless, participates in the production of the reactive species.

The liquid composition according to the invention can also contain additives used conventionally in compositions intended for manufacturing optical and ophthalmic elements, in standard proportions, namely, inhibitors, dyes, UV absorbers, fragrances, deodorants, surface active agents, surfactants, binders, antioxidants and anti-yellowing agents.

B-C/ Voxel Inter-Diffusion and Post-Treatment

As used herein, "inter-diffuse," and derivatives, means movement of at least an ion, molecule, portion of a molecule, or portion of a polymer chain, from the space occupied by one voxel into the space occupied by a juxtaposed, physically contacting, voxel. Inter-diffusion can occur spontaneously or be induced by mechanical, physical, or chemical treatment. For example, a mechanical treatment includes agitation, such as by exposure to ultra-sonic energy, high-frequency vibratory device, etc., which promote mixing at the voxel boundaries. Macro-diffusion is a mechanical method wherein the voxels are blended or "smeared" by table vibrations, especially where such vibrations occur at the time of deposition, resulting in intimate voxel-to-voxel contact. An exemplary physical treatment includes a thermal treatment by exposure to heat, infra-red, microwave, etc., radiation. A thermal treatment increases temperature above the glass-liquid transition point (Tg) of the high viscosity domain in the voxels and promotes inter-diffusion. An exemplary chemical treatment includes a chemical reaction between reactive species of composition. The molecular mass of the polymers present in the voxels can be reduced, such as by two-pathway chemistries or reversible reactions, to promote inter-diffusion.

Then in accordance with inter-diffusion process, an object of the invention is a method comprises the step of constitute a voxel wherein the liquid composition represents a thermoplastic polymer dissolved in a solvent. Advantageously the thermoplastic polymer is selected from polystyrene, polycarbonate, and polymethylmethacrylate, and preferentially polystyrene and polymethylmethacrylate, with the solvent is selected from toluene, methyl isobutyl ketone, anisole, ethyl lactate, acetone, and ethyl acetate. In this embodiment the step to increase the viscosity of voxel or intermediate element is preferentially managed trough an "approach 2", as mentioned hereinbefore, using an evaporation process. Then in a preferred embodiment of this method, after constitution of a first voxel of thermoplastic polymer dissolved in its appropriate solvent in a state 1a, an evaporation step to increase viscosity of said voxel is realized to end-up a stable voxel of composition to a state 2a which is now partially dissolved. A second adjacent voxel of same thermoplastic polymer and same solvent, to a state 1b is constituted. The solvent contained in said second voxel is able to spontaneous diffuse to said first voxel, to create an intermediate element. After repeating these hereinbefore steps until the constitution of the final element, a post-treatment step, like heating by convection or using infra-red radiation, is realized to enhance inter-diffusion inside the final element and produce a transparent ophthalmic lens in accordance with the invention.

We will now describe in more details different chemical materials that could be used in accordance with the invention.

Liquid Composition:

By extension, in accordance with the invention, a liquid composition could include a thermoplastic polymer. By thermoplastic polymer it is understood a thermoplastic resin selected from polymethyl(meth)acrylate, polycarbonate, polycarbonate/polyester blends, polyamide, polyester, polystyrene, cyclic olefin copolymers, polyurethane, polysulfone and combinations thereof.

Now we will described in more details list of monomer and/or oligomer and initiators that could be used in the present invention:

Epoxy, Thioepoxy:

Epoxy monomers are classified as either aromatic (such as bisphenol A and F epoxies) or aliphatic. Aliphatic epoxies are lower in viscosity. Aliphatic epoxies can be both completely saturated hydrocarbons (alkanes) or can contain double or triple bonds (alkenes or alkynes). They can also contain rings that are not aromatic. Epoxy may be also monofunctional or polyfunctional, and such epoxy may be from the family of alkoxysilane epoxy.

Non-alkoxysilane polyfunctional epoxy monomers may be selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether such as pentaerythritol tetraglycidyl ethertrimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures thereof.

The monoepoxysilanes are commercially available and include, for example, beta-(3,4-epoxycyclohexyl)-ethyltrimethoxysilane, (gamma-glycidoxypropyltrimethoxysilane), (3-glycidoxypropyl)-methyl-diethoxysilane, and gamma-glycidoxy-propylmethyldimethoxysilane. These commercially available monoepoxysilanes are listed solely as examples, and are not meant to limit the broad scope of this invention. Specific examples of the alkyltrialkoxysilane or tetraalkoxysilane suitable for the present invention include methyltrimethoxysilane, ethyltrimethoxysilane, phenyltrimethoxysilane, phenyltrimethoxysilane, methyltriethoxysilane, ethyltriethoxysilane.

(Meth)Acrylate:

As used in the present invention the term acrylate and acrylic referred to the same chemical functionality. The word "meth" in two brackets as "(meth)" associated to the term acrylate, specifies that relating to a molecule or to a family of molecules the acrylate function $H_2C=CHC(O)-$ could have a methyl group at a position of the ethylene function like $H_2C=C(CH_3)C(O)-$.

(Meth)acrylates can be monofunctional, difunctional, trifunctional, tetrafunctional, pentafunctional, and even hexafunctional. Typically, the higher the functionality, the greater is the crosslink density. (Meth)acrylates have slower curing than the acrylates.

The two, three, four or six (meth)acrylic functional groups is selected from the group consisting of pentaerythritol triacrylate, pentaerythritol tetraacrylate, tetraethyleneglycol diacrylate, diethyleneglycol diacrylate, triethyleneglycol diacrylate, 1,6-hexanediol di(meth)acrylate, tripropylene glycol diacrylate, dipropyleneglycol diacrylate, ethyleneglycol dimethacrylate, trimethylolethane triacrylate, trimethylolmethane triacrylate, trimethylolpropane triacrylate, trimethylolpropane trimethacrylate, 1,2,4-butanetriol trimethacrylate, tris(2-hydroxyethyl) isocyanurate triacrylate, di-trimetholpropane tetraacrylate, ethoxylated pentaerythritol tetraacrylate, triphenylolmethane triacrylate, trisphenol triacrylate, tetraphenylol ethane triacrylate, 1,2,6-hexanetriol triacrylate, glycerol triacrylate, diglycerol triacrylate, glycerol ethoxylate triacrylate, ethylene glycol diacrylate, 1,4-butanediol diacrylate, 1,4 butanediol dimethacrylate, neopentyl glycol diacrylate, cyclohexanedimethanol diacrylate, dipropylene glycol diacrylate, polypropylene glycol diacrylate dipentaerythritol hexaacrylate, polyester hexaacrylate, sorbitol hexaacrylate, and fatty acid-modified polyester hexaacrylate, and is most preferably dipentaerythritol hexaacrylate.

Among monomer and/or oligomer comprising this reactive group, we can mention the monomer corresponding to the above formula.

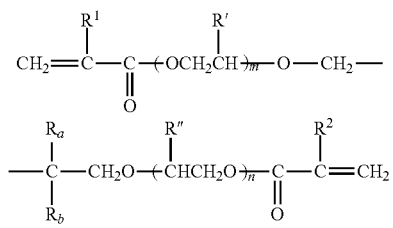

In which R1, R2, R' and R" represent, independently of one another, a hydrogen atom or a methyl radical, Ra and Rb, which are identical or different, each represent an alkyl group having 1 to 10 carbon atoms, and m and n are integers wherein m+n is comprised between 2 to 20 inclusive.

Among the monomers particularly recommended in the compositions according to the invention, of 2,2-di(C2-C10) alkyl-1,3-propanediol 2x-propoxylate di(meth)acrylate and 2,2-di(C2-C10)alkyl-1,3-propanediol 2x-ethoxylate di(meth)acrylate, like for example 2-ethyl-2-n-butyl-1,3-propanediol 2x-propoxylate dimethacrylate. (Meth)acrylic monomers as mentioned above and their process of preparation are disclosed in the document WO-95/11219. This kind of monomer is able to be polymerized by photopolymerization techniques or mixed photopolymerization and thermal polymerization techniques.

Advantageously the composition comprising this (meth) acrylic monomer can comprise other monomer(s) polymerizable by a radical route, and presenting one or more (meth)acrylate functional groups and/or one or more allyl groups. Mention may be made, among these monomers, of poly(methylene glycol) mono- and di(meth)acrylates, poly(ethylene glycol) mono- and di(meth)acrylates, poly(propylene glycol) mono- and di(meth)acrylates, alkoxypoly(methylene glycol) mono- and di(meth)acrylates [sic], alkoxypoly(ethylene glycol) mono- and di(meth)acrylates [sic] and poly(ethylene glycol)-poly(propylene glycol) mono- and di(meth)acrylates. These monomers are disclosed, inter alia, in the document U.S. Pat. No. 5,583,191.

Mention may be made, among monomers comprising a (meth)acrylate functional group and an allyl group, of tri (propylene glycol) di(meth)acrylate, poly(ethylene glycol) dimethacrylate [sic] (for example, poly(ethylene glycol-600) dimethacrylate, poly(propylene glycol) dimethacrylate [sic] (for example, poly(propylene glycol-400) dimethacrylate), bisphenol A alkoxylate dimethacrylate [sic], in particular bisphenol A ethoxylate and propoxylate dimethacrylate [sic] (for example, bisphenol A 5-ethoxylate dimethacrylate, bisphenol A 4,8-ethoxylate dimethacrylate and bisphenol A 30-ethoxylate dimethacrylate). Mention may also be made, among the monofunctional monomers, of aromatic mono(meth)acrylate oligomers, and, among the trifunctional monomers, of tri(2-hydroxyethyl)iso-cyanurate triacrylate, trimethylolpropane ethoxylate acrylate [sic] and trimethylolpropane propoxylate acrylate [sic].

The liquid composition according to the invention and comprising such (meth)acrylate monomer and/or oligomer, also comprises a system for initiating the polymerization. The polymerization initiating system can comprise one or more thermal or photochemical polymerization initiating agents or alternatively, preferably, a mixture of thermal and photochemical polymerization initiating agents.

Generally, the initiating agents are used in a proportion of 0.01 to 5% by weight with respect to the total weight of monomers present in the composition. As indicated above, the composition more preferably simultaneously comprises a thermal polymerization initiating agent and a photoinitiator.

Thio(Meth)Acrylate:

Among monomer and/or oligomer comprising this reactive group, the present invention can notably use functional monomers of mono(thio)(meth)acrylate or mono- and di(meth)acrylate type bearing a 5- to 8-membered heterocycle consisting of hydrogen, carbon and sulphur atoms and having at least two endocyclic sulphur atoms. Preferably, the heterocycle is 6- or 7-membered, better still 6-membered. Also preferably, the number of endocyclic sulphur atoms is 2 or 3. The heterocycle can optionally be fused with a substituted or unsubstituted C5-C8 aromatic or polycyclanic ring, preferably a C6-C7 ring. When the heterocycle of the functional monomers contains 2 endocyclic sulphur atoms, these endocyclic sulphur atoms are preferably in positions 1-3 or 1-4 of the heterocycle. According to the invention, the monomer is preferably also a thio(meth)acrylate monomer. Lastly, the monomers according to the invention preferably have molar masses of between 150 and 400, preferably 150 and 350 and better still between 200 and 300. Example of such monomers is described to U.S. Pat. No. 6,307,062 which is incorporated by reference.

Advantageously the liquid composition comprising such thio(meth)acrylate monomers may comprise a co-monomer.

Among the co-monomers which can be used with the monomers of (thio)(meth)acrylate type for compositions according to the invention, mention may be made of mono- or polyfunctional vinyl, acrylic and methacrylic monomers.

Among the vinyl co-monomers which are useful in the compositions of the present invention, mention may be made of vinyl alcohols and vinyl esters such as vinyl acetate and vinyl butyrate. The acrylic and methacrylic co-monomers can be mono- or polyfunctional alkyl (meth)acrylate co-monomers and polycyclenic or aromatic mono(meth)acrylate co-monomers. Among the alkyl (meth)acrylates, mention may be made of styrene, .alpha.-alkylstyrenes such as .alpha.-methyl styrene, methyl (meth)acrylate, ethyl (meth)acrylate, butyl (meth)acrylate, isobutyl (meth)acrylate or difunctional derivatives such as butanediol dimethacrylate, or trifunctional derivatives such as trimethylolpropane trimethacrylate.

Among the polycyclenic mono(meth)acrylate co-monomers, mention may be made of cyclohexyl (meth)acrylate, methylcyclohexyl (meth)acrylate, isobornyl (meth)acrylate and adamantyl (meth)acrylate.

Co-monomers which may also be mentioned are aromatic mono(meth)acrylates such as phenyl (meth)acrylate, benzyl (meth)acrylate, 1-naphthyl (meth)acrylate, fluorophenyl (meth)acrylate, chlorophenyl (meth)acrylate, bromophenyl (meth)acrylate, tribromophenyl (meth)acrylate, methoxyphenyl (meth)acrylate, cyanophenyl (meth)acrylate, biphenyl (meth)acrylate, bromobenzyl (meth)acrylate, tribromobenzyl (meth) acrylate, bromobenzylethoxy(meth)acrylate, tribromobenzylethoxy(meth)acrylate and phenoxyethyl (meth)acrylate.

The crosslinking process which is particularly suitable for liquid composition based on thio(meth)acrylate alone or in combination with at least one co-monomer, as defined hereinbefore, are photochemical polymerization or a combination of a photochemical polymerization and a thermal condensation reaction. A recommended polymerization process is photochemical polymerization via ultraviolet radiation and preferably UV-A radiation. Thus, the composition also contains photo-initiators and/or condensation catalysts. Preferably photo-initiators and/or thermal catalyst, are present in proportions of from 0.001 to 5% by weight relative to the total weight of the composition, and even more preferably from 0.01 to 3.5%. The photo-initiators which can be used in composition according to the invention are, in particular, 2,4,6-trimethylbenzoyldiphenylphosphine oxide, 1-hydroxycyclohexyl phenyl ketone, 2,2-dimethoxy-1,2-diphenyl-1-ethanone and alkylbenzoin ethers.

Vinyl Ether:

Vinyl ether group presents as reactive group to monomer and/or oligomer is also suitable. Example of such compound comprising this functionality are ethyl vinyl ether, propyl vinyl ether, isobutyl vinyl ether, cyclohexyl vinyl ether, 2-ethyl hexyl vinyl ether, butyl vinyl ether, ethyleneglycol monovinyl ether, diethyleneglycol divinyl ether, butane diol divinyl ether, hexane diol divinyl ether, cyclohexane dimethanol monovinyl ether Isocyanate:

Among the preferred polyisocyanate or isothiocyanate monomers and/or oligomers suitable in accordance with the present invention, there may be cited tolylene diisocyanate or diisothiocyanate, phenylene, diisocyanate or diisothiocyanate, ethylphenylene diisocyanate or diisothiocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4,4'-diphenyl methane diisocyanate or diisothiocyanate, naphthalene diisocyanate or diisothiocyanate, isophorone diisocyanate or diisothiocyanate, bis(isocyanate or diisothiocyanate methyl) cyclohexane, hexamethylene diisocyanate or diisothiocyanate, and dicyclohexylmethane diisocyanate or diisothiocyanate.

Polythiol:

Among the preferred polythiol monomers and/or oligomers suitable in accordance with the present invention, there may be citedaliphatic polythiols such as pentaerythritol tetrakis mercaptopropionate, 1-(1'-mercaptoethylthio)-2,3-dimercaptopropane, 1-(2'-mercapropylthio)-2,3-dimercaptopropane, 1-(3'-mercapropylthio)-2,3-dimercaptopropane, 1-(4'-mercabutylthio)-2,3-dimercaptopropane, 1-(5'-mercapentylthio)-2,3-dimercaptopropane, 1-(6'-mercahexylthio)-2,3-dimercaptopropane, 1,2-bis-(4'-mercaptobutylthio)-3-mercaptopropane, 1,2-bis-(5'-mercaptopentylthio)-3-mercaptopropane, 1,2-bis-(6'-mercaptohexylthio)-3-mercaptopropane, 1,2,3-tris(mercaptomethylthio)propane, 1,2,3-tris(3'-mercaptopropylthio)propane, 1,2,3-tris(2'-mercaptoethylthio)propane, 1,2,3-tris(4'-mercaptobutylthio) propane, 1,2,3-tris(6'-mercaptohexylthio)propane, methanedithiol, 1,2-ethndithiol, 1,1-propanedithiol, 1,2-propanedithiol, 1,3-propanedithiol, 2,2-propanedithiol, 1,6-hexanethiol-1,2,3-propanetrithiol, and 1,2-bis(2'-mercaptoethylthio)-3-mercaptopropane.

Photo-Initiators:

Photo-initiator may be used alone or in a mixture of two or more compounds, or as a combination or two or more compounds like co-initiators. The choice of photo-initiator is based firstly to the nature of reactive group(s) of monomer and/or oligomers used in the liquid polymerization composition and also to the kinetic of polymerization. Then it is well-known that cationic curable compositions cure slower than free radically curable compositions. In term of methods used in accordance with the various embodiments of the invention, the man skilled in the art will adapt easily the choice of such photoinitiator. More particularly, the choice of photoinitiator may be managed by the nature of reactions used to increase viscosity of liquid composition.

Free-Radical Photo-Initiator:

Example of Free radical initiator suitable for the present invention, are listed below, without any limitation: benzophenone, methyl benzophenone, xanthones, acylphosphine oxide type such as 2,4,6,-trimethylbenzoyldiphenyl phosphine oxide, 2,4,6,-trimethylbenzoylethoxydiphenyl phosphine oxide, bisacylphosphine oxides (BAPO), benzoin and benzoin alkyl ethers like benzoin methyl ether, benzoin isopropyl ether.

Free radical photo-initiators can be selected also for example from haloalkylated aromatic ketones such as chloromethylbenzophenones; some benzoin ethers such as benzoin methyl ether, benzoin ethyl ether, benzoin isopropyl ether, benzoin isobutylether ether, benzoin, benzyl, benzyl disulfide; dialkoxyacetophenones such as diethoxyacetophenone and α,α-dimethoxy-α-phenylacetophenone, benzylideneacetophenone, benzophenone, acetophenone; hydroxy ketones such as (1-[4-(2-hydroxyethoxy)-phenyl]-2-hydroxy-2-methyl-1-propan-1-one) (Irgacure® 2959 from CIBA), 2,2-di-sec-butoxyacetophenone, 2,2-diethoxy-2-phenyl-acetophenone, 1-hydroxy-cyclohexyl-phenyl-ketone (Irgacure® 184 from CIBA) and 2-hydroxy-2-methyl-1-phenylpropan-1-one (such as Darocur® 1173 sold by CIBA); alpha amino ketones, particularly those containing a benzoyl moiety, otherwise called alpha-amino acetophenones, for example 2-methyl 1-[4-phenyl]-2-morpholino-propan-1-one (Irgacure® 907 from CIBA), (2-benzyl-2-dimethyl amino-1-(4-morpholinophenyl)-butan-1-one (Irgacure® 369 from CIBA); monoacyl and bisacyl phosphine oxides and sulphides, such as phenylbis(2,4,6-trimethylbenzoyl)-phosphine oxide (Irgacure® 819 sold by CIBA); triacyl phosphine oxides; and mixtures thereof.

Mention may be made, among the photoinitiators, of in particular 2,4,6-trimethylbenzoyldiphenyl-phosphine oxide, 1-hydroxycyclohexyl phenyl ketone, 2,2-dimethoxy-1,2-diphenylethane-1-one [sic] and alkyl benzoyl ethers.

Cationic Photo-Initiator:

Cationic photo-initiator comprises notably compounds which are able to form aprotic acids or Bronseâd acids upon exposure to activating light like UV or visible light. Examples of suitable cationic photo-initiator, without any limitations are listed below: aryldiazonium salts, diaryliodonium salts, triarylsulfonium salts, triarylselenium salts.

Thermal-Initiator:

Mention may be made, among the thermal polymerization initiating agents which can be used in the present invention, of organic peroxides, inorganic peroxides, or azo initiators. Organic peroxides can include, but are not limited to, peroxycarbonates, peroxyesters, dialkylperoxides, diacylperoxide, diperoxyketals, ketoneperoxides, hydroperoxides, benzoyl peroxide, cyclohexyl peroxydicarbonate and isopropyl peroxydicarbonate Inorganic peroxide thermal initiators can include, but are not limited to, ammoniumpersulfate, potassiumpersulfate, and sodiumpersulfate.

Co-Initiator:

As used herein, a co-initiator represents a molecule as part of a chemical system which does not absorb light but, nevertheless, participates in the production of the reactive species. Co-initiator is particularly suitable in combination with some free-radical initiator, like benzophenone which requires a second molecule, such as an amine, to produce a curable radical. Then, under UV radiation, benzophenone reacts with a tertiary amine by hydrogen abstraction, to generate an alpha-amino radical which is well known to initiate polymerization of (meth)acrylate monomer(s) and/or oligomer(s)

Examples of co-initiators are listed below comprise reactive amine co-initiators commercially available from Sartomer company under the trade names of CN-381, CN6383, CN-384, and CN-386, where these co-initiators are monoacrylic amines, diacrylic amines, or mixture thereof. Other co-initiators include triethylamine, N-methyldiethanloamine, triethanolamine, ethyl-4-simethylaminobenzoate, ethyl-2-dimethylaminobenzoate, n-butoxyethyl-4-dimethylamino benzoate-p-dimethyl amino benzaldehyde, N,N-dimethyl-p-toluidine, and octyl-p-(dimethylamino)benzoate.

In accordance with the invention, advantageous monomers and/or oligomers are such presented reactive groups selected from epoxy and acrylic, Solvents:

In accordance to the invention, solvents suitable for liquid composition comprising monomers and/or oligomers are organic solvents, preferentially polar solvent like methanol, ethanol, propanol, butanol, glycols, and glycol monoethers. This solvent could be used alone or in combination.

Solvents suitable for liquid composition comprising polymers like thermoplastic polymers are also organic solvents, preferentially solvent like toluene, benzene, dichloromethane, methyl isobutyl ketone, anisole, ethyl lactate or ethyl acetate.

One object of the present invention is to provide a method of manufacturing a three-dimensional ophthalmic lens and more particularly an ophthalmic lens.

"Ophthalmic lens", according to the invention, is defined as lens adapted namely for mounting in eyeglasses whose function is to protect the eye and/or to correct vision; this lens is selected from the afocal, unifocal, bifocal, trifocal, and progressive lens. Then it is understood that ophthalmic lens may be corrective or un-corrective. Eyeglasses wherein ophthalmic lens will be mounted could be either traditional frame comprising two distinctive ophthalmic lenses, one for the right eye and one for the left eye, or like mask, visor, helmet sight or goggle, wherein one ophthalmic lens facing simultaneously the right and the left eyes. Ophthalmic lens manufactures by a method of the invention may be produces with traditional geometry as a circle or may be produced to be fitted to the frame intended. The present invention presents a great advantage to manufacture directly a three-dimensional ophthalmic lens in accordance with the geometry of the frame for which said ophthalmic lens is dedicated.

Ophthalmic lens manufacture in accordance with a method of the invention can furthermore be functionalized, in a further step after optionally post-treatment step, by adding at least a functional coating and/or a functional film. Functionalities may be added on one face of the ophthalmic lens, or on the two faces of ophthalmic lens, and on each faces, functionalities may be identical or different. Among the functionality, it may be mentioned, as example and without any limitation a functionality selected from anti-impact, anti-abrasion, anti-soiling, anti-static, anti-reflective, anti-fog, anti-rain, self-healing, polarization, tint, photochromic, selective wavelength filter which could be obtain through an absorption filter or reflective filter. Such selective wavelength filters are particularly interested to filter ultraviolet radiation, blue light radiation, or infra-red radiation for example.

The functionality may be added by at least one process selected from dip-coating, spin-coating, spray-coating, vacuum deposition, transfer process or lamination process. By transfer process it is understood that functionality is firstly deposited on a support like a carrier, and then is transferred from said carrier to said ophthalmic lens through an adhesive layer deposited between the two elements. Lamination is defined as obtaining a permanent contact between a film which comprises at least one functionality as mentioned hereinbefore and the surface of the ophthalmic lens to be treated, said permanent contact being obtained by the establishment of a contact between said film and said lens, followed optionally by a polymerization step or a heating step, in order to finalize the adhesion and adherence between the two entities. At the end of this lamination process the assembled film and the optical lens form one single entity. Usually to lamination process, glue is present in the interface of the film and the ophthalmic lens.

Ophthalmic lens manufacture by a method of the present invention should present the following characteristics: a high transparency with an absence of or optionally a very low light scattering or haze, a high Abbe number of greater than or equal to 30 and preferably of greater than or equal to 35, in order to avoid chromatic aberrations, a low yellowing index and an absence of yellowing over time, a good impact strength (in particular according to the CEN and FDA standards), a good suitability for various treatments (shock-proof primer, anti-reflective or hard coating deposition, and the like) and in particular good suitability for colouring, a glass transition temperature value preferably of greater than or equal to 65° C. and better still of greater than 90° C. Haze is the percentage of transmitted light that, in passing through specimen, deviates from the incident beam by forward scattering. Only light flux deviating more than 2.5° on the average is considered to be haze.

On other word, Haze is a measure of intensity of the transmitted light that is scattered more than 2.5°. It appears as a milky, smoky, hazy field when looking through a packaging material. Low values are a measurement of low "haze". As haze increases, loss of contrast occurs until the object cannot be seen. Usually an ophthalmic lens could present a haze level less than 1.

EXAMPLES

The following Table 1 describes various methods wherein particular processes for each of the steps of viscosity increase, voxel inter-diffusion, and post-diffusion processing or treatment are advantageously combined to manufacture a transparent ophthalmic lens. Each method described in Table 1 represents a specific embodiment of the present invention. For reference in reading the Table 1, various processes are assigned the following reference identifiers:

1) Increase in voxel viscosity can be achieved by:
   1a) cationic cross-linking,
   1b) free-radical cross-linking,
   1c) condensation-thermal cross-linking,
   1d) evaporation, and
   1e) decrease in temperature;

2) voxel inter-diffusion can be achieved by:
   2a) spontaneous inter-diffusion,
   2b) exposure to radiation (heat, infra-red, microwave, etc.),
   2c) mechanical agitation,
   2d) decrease of molecular mass trough reversible chemical reactions (such as Diels-Alders, hydrogen bonding, chelation, etc.), and
   2e) exposure to a solvent;

3) post-treatment can be achieved by:
   3a) cationic cross-linking,
   3b) free-radical cross-linking,
   3c) condensation-thermal cross-linking,
   3d) annealing,
   3e) drying, and
   3f) evaporation.

The methods indicated by the Table 1 are exemplary in nature and not limiting

TABLE 1

| Example Number | Viscosity increase | Inter-diffusion | Post-treatment |
|---|---|---|---|
| 1 | 1a or 1b | 2a | 3b or 3a |
| 2 | 1a | 2b | 3a or 3c |
| 3 | 1d | 2b | — |
| 4 | 1d | 2a | 3a |
| 5 | 1d | 2b | 3b |
| 6 | 1e | 2a or 2b | 3a |
| 7 | 1e | 2a or 2b | 3b |
| 8 | 1e | 2a or 2b | 3a + 3b |
| 9 | 1a or 1b | 2d | — |
| 10 | 1b | 2a | 3b |
| 11 | 1e | 2a | 3b |
| 12 | 1a or 1b | 2a | 3a or 3b |
| 13 | 1d | 2a or 2b | 3a |
| 14 | 1d | 2a or 2b | 3b |

Example 1: Increase Viscosity by UV Cross-Linking/Spontaneous Inter-Diffusion/Post-Treatment by UV Cross-Linking In one example, the following method is used to manufacture a three-dimensional transparent ophthalmic lens comprising the following steps:

/1/—constitute a first voxel of a liquid composition (A), at a state 1a, comprising a mixture of at least: a) an epoxy aliphatic monomer and/or oligomer, or an epoxy silane monomer and/or oligomer; b) an acrylic monomer and/or oligomer; and c) a cationic photoinitiator; The composition preferably consists of multi-epoxy functional glycidyl ethers and a combination of di-, tri- and tetra-functional acrylates and more preferably consists of a mixture of trimethylolpropane triglycidyl ether, sorbitol polyglycidyl ether, 1,4 butanediol diacrylate, pentaerythritol triacrylate, and triaryl sulfonium hexafluoroantimonate as cationic photoinitiator.

/3/—increasing the viscosity of said voxel, to a state 2a, by exposing it to UV radiation, thereby cross-linking the epoxy component while leaving uncured the acrylic component of the first voxel; in state 2a, this voxel is in a partially cured state (cured epoxy reactive group, uncured acrylic reactive group);

/2/ constitute, adjacent to the first voxel, a new voxel of a liquid composition (B), at a state 1b, comprising a mixture of at least: a) an epoxy aliphatic monomer and/or oligomer, or an epoxy silane monomer and/or oligomer; b) an acrylic monomer and/or oligomer; and c) a free-radical photoinitiator; that is, the composition (B) comprises the same monomer and/or oligomer of composition (A), but differs from composition (A) by the nature of the photoinitiator; The free radical photo-initiator is preferably phenylbis(2,4,6-trimethylbenzoyl)-phosphine oxide and more preferably a mixture of phenylbis(2,4,6-trimethylbenzoyl)-phosphine oxide and 2-hydroxy-2-methyl-1-phenylpropane-1-one.

/4/—inter-diffusing the first voxel (in state 2a) and the new voxel (in state 1b), namely by inter-diffusing the (uncured) acrylic component of the first voxel with the acrylic component of the new voxel; the inter-diffusion is spontaneous, to obtain an intermediate element;

/3A/—increasing viscosity of said intermediate element to submit it to UV radiation and curing the acrylic component of the first voxel and the acrylic component of the new voxel, thereby cross-linking the (already inter-diffused) acrylic components of the composition (A) and composition (B); the epoxy component of the second voxel remains uncured such that the new voxel is now in a State 2b, that is, partially cured and with an increased viscosity; the first voxel is now in a State 3a, that is, fully cured; the first and second voxels are now merged into a single unit, having cured acrylic and a mixture of cured and uncured epoxy;

/5/—repeating steps /2/to /3A/, depositing alternating voxels of liquid composition (A) and liquid composition (B), alternately curing epoxy and acrylic components of the composition, and forming sequentially larger merged members until obtaining the three-dimensional, transparent, ophthalmic lens; and /6/—optionally, but preferentially applying one post-treatments, such as photo-polymerization, thereby completing the polymerization of the ophthalmic lens.

As will be understood by those skilled in the art, the alternating exposure of voxels to UV radiation can optionally require alternating types of UV radiation depending on the absorption spectra of the cationic and free radical photo-initiator(s) chosen. For example, UV radiation of a first intensity and frequency can be used to cure the epoxy components, while UV radiation of a second intensity and frequency can be used to cure the acrylic components, or UV radiation of the same intensity and frequency could be used if the cationic and free radical photoinitiators have overlapping absorption spectra. Further, alternating voxels can be viewed as voxels of a selected composition and having alternating photo-initiator types.

In this example, both liquid compositions are hybrids of epoxy and acrylic. Those of skilled in the art will recognize that the two liquid compositions can use the same epoxy and acrylic components (differing only in initiator type) or differing epoxies and/or acrylics can be used in the two liquid compositions. In this example, the epoxy is aliphatic or epoxy silane.

With reference to FIGS. 3A-C, which could illustrate example 1 manufactured trough a stereolithography technology, the voxels are successive layers n, n+1, n+2 . . . , of composition. Each layer is deposited, as a liquid, by an Additive Manufacturing device preferentially a device being able for stereolithography process. The layers are of alternating liquid composition (A) and liquid composition (B), similar except for alternating types of photo-initiator (cationic, free-radical). At FIG. 3A, layer n is deposited and exposed to UV radiation, increasing the viscosity of the layer by partial curing, such that the epoxy component is cured (cross-linked) while the acrylic component remains uncured.

At FIG. 3B, layer n+1, in a liquid state, is deposited above layer n. The uncured acrylic components of layers n and n+1 spontaneously inter-diffuse. Layers n and n+1 are exposed to UV radiation, the UV radiation penetrating both layers. The viscosity of layer n+1 is increased by partial curing, such that the acrylic component is cured (cross-linked) while the epoxy component remains uncured. Layer n is fully cured, with both epoxy and acrylic components cross-linked.

At FIG. 3C, layer n+2, in a liquid state, is deposited above layer n+1. The layers n+1 and n+2 inter-diffuse spontaneously, with the uncured epoxy components mingling. Exposure to UV radiation cures the epoxy components, thereby increasing the viscosity of layer n+2, and fully curing layer n+1. Further, layer n+ . . . undergoes post-processing by exposure to UV radiation as it is still within UV penetration range.

In a preferred embodiment, the deposition of alternating voxels is accomplished by alternating nozzles or other deposition machine components. Thus, the first composition is deposited by a first nozzle while the second composition is deposited by a second nozzle.

The process is repeated with additional layers until the desired ophthalmic lens is completed. The final layers may undergo further UV radiation (or other processes) to fully cure those layers. Such a method results in good inter-voxel bonding and homogeneity of the completed element.

The "surface" on which the voxels are deposited can be a substrate for that purpose or a previously deposited layer or voxel.

In a particular embodiment of the present invention, the "surface" may represent a part of the three-dimensional transparent ophthalmic lens. In this case, it means for example that at least part of the bulk of said ophthalmic lens is previously manufactured using either an additive manufacturing technology or a traditional ophthalmic technology like for example injection molding, reactive injection molding or casting molding. Then the present method of invention may be used around or at least on one side of this bulk, to constitute an envelope, the ophthalmic lens being the result of the bulk and the envelope. Advantageously, the bulk may submit a pre-treatment to activate its surface, to guarantee adhesion and cohesion with envelope manufacturing by additive manufacturing technology in accordance with the present invention.

Example 2: Increase Viscosity by UV Cross-Linking/Inter-Diffusion by Heat Treatment/Post-Treatment by UV Cross-Linking In another example, the following method is used to manufacture a three-dimensional transparent ophthalmic lens comprising the following steps:

1. constitute a first voxel of a liquid composition (A), at a state 1a, comprising a mixture of at least: a) an epoxy silane or a prepolymer of an epoxysilane, preferentially 3-glycidoxypropyltrimethoxysilane; and b) a cationic photo-initiator preferentially a triarylsulfonium metal salt and more preferably triarylsulfoniumhexafluorophosphate;

2. increasing viscosity of the first voxel by exposing it to UV radiation, thereby: a) partially cross-linking the epoxy group and; b) hydrolyzing the methoxysilane group with acid generated during photolysis of the cationic photo-initiator to obtain a liquid composition to a state 1b;

3. repeating steps 1 and 2 with new voxels of the liquid composition (A), at a state 1a, the additional voxels adjacent to at least one previously constituted voxel; the steps are repeated until a desired number of voxels have been deposited; for example, repetition can be stopped after constitution of immediately adjacent voxels or after constitution of an entire layer that may represents an intermediate element;

4. inducing heating to provoke inter-diffusion between adjacent voxels and to begin a condensation cure; the thermal cross-linking is advanced enough to remove most of the water resulting from the condensation; and 5. exposing the resulting, merged voxels to a finishing cure, such as UV radiation, to ensure relevant mechanical integrity and homogeneous characteristics of the ophthalmic lens.

Constitution of voxel(s) is performed by an Additive Manufacturing device, like polymer jetting or stereolithography. The voxels can be discrete units smaller than a layer or a layer. The process of steps 1-3 is repeated until a desired geometry of merged voxels is achieved, such as a layer of an ophthalmic lens or the ophthalmic lens by itself. Step 4 is then performed on the desired geometry of merged voxels. This process is repeated to form an additional desired geometry of merged voxels, such as a second layer. The later-formed layers also merge with previously formed layers. Step 5 can be performed, without limitation, once the merged voxels define the desired ophthalmic lens.

Example 3: Increase Viscosity by Evaporation/Inter-Diffusion by Heat Treatment/No Post-Treatment In another example, the following method is used to manufacture a three-dimensional transparent ophthalmic lens comprising the following steps:
1. constitute a first voxel of a liquid composition (A), at a state 1a, comprising a viscous fluid of at least a thermoplastic polymer preferentially polymethylmethacrylate dissolved in an appropriate solvent, preferentially anisole or ethyl lactate and more preferably, ethyl lactate;
2. flashing-off by evaporation, preferentially using microwave, a sufficient amount of the solvent, resulting in a stable first voxel, in a state 2a, with viscosity between 5 times to 20 times the viscosity in state 1a, to substantially maintain its geometry during later steps;
3. constitute a new voxel of same liquid composition (A) used to step. 1 adjacent to the first voxel;
4. inter-diffuse said voxels by partially dissolving the first voxel using the solvent of the new voxel to create an intermediate element (n);
5. increasing viscosity by evaporation, preferentially using microwave, a sufficient amount of the solvent in the new voxel; and
6. repeating X times, steps 3 to 5 to obtain an intermediate element (n+(X)), then post-treating by heating preferentially by local convection heating or IR (infra-red) radiation, to enhance inter-diffusion between voxels.

The process involves solvent evaporation from a thermoplastic composition and thermally induced diffusion between voxels. Exemplary compositions include: polystyrene and toluyl; and polymethylmethacrylate with ethyl lactate.

Example 4: Increase Viscosity by Evaporation/Spontaneous Inter-Diffusion/Post-Treatment by UV Cross-Linking In another example, the following method is used to manufacture a three-dimensional transparent ophthalmic lens comprising the following steps:
1. constitute a first voxel of liquid composition (A) comprising a mixture of at least: a) an epoxy monomer and/or oligomer (like, Epalloy 7190, a bisphenol-A epoxy resin, or Epalloy 5001, a cycloaliphatic epoxy resin, both from Emerald Performance Materials) b) a solvent preferentially methanol, c) and a cationic photo-initiator, (e.g., triarylsulphonium hexafluorophosphate) in a State 1a;
2. flashing-off by evaporation a sufficient amount of the solvent, resulting in a stable first voxel, in a State 2a, with viscosity between 5 tunes to 20 times the viscosity in state 1a, to substantially maintain its geometry during later steps;
3. Constitute an adjacent new voxel of same liquid composition (A);
4. inter-diffusing spontaneously the two voxels,
5. repeating steps 1 to 3 with additional new voxels up to a desired amount;
6. post-treating by cross-linking the plurality of inter-diffused voxels, such as with UV radiation, thereby curing the voxels and improving mechanical properties of the resulting element; UV radiation will initiate the cationic photo-initiator for an epoxy-based composition.

Example 5: Increase Viscosity by Evaporation/Spontaneous Inter-Diffusion/Post-Treatment by UV Cross-Linking In another example, the following method is used to manufacture a three-dimensional transparent ophthalmic lens comprising the following steps:
1. constitute a first voxel of liquid composition (A) comprising a mixture of at least: a) a (meth)acrylate monomer and/or oligomer, (like CN9004, an aliphatic urethane acrylate from Sartomer), b) a solvent like methanol, c) and a photo-initiator such as a blend of phenylbis(2,4,6-trimethylbenzoyl)-phosphine oxide and 2-hydroxy-2-methyl-1-phenylpropane-1-one, free radical photoinitiators, in a state 1a;
2. increasing viscosity by evaporation, preferentially by infra-red heating, a sufficient amount of the solvent, resulting in a stable first voxel, in a state 2a, with viscosity between 5 times to 20 times the viscosity of state 1a, to substantially maintain its geometry during later steps;
3. constitute an adjacent new voxel of same liquid composition (A);
4. inter-diffusing spontaneously the two voxels;
5. repeating steps 1 to 3 with additional new voxels up to a desired amount;
6. post-treating by cross-linking the plurality of inter-diffused voxels, such as with UV radiation, thereby curing the voxels and improving mechanical properties of the resulting element; UV radiation will initiate the free radical photo-initiator for an acrylate-based composition.

Example 6: Increase Viscosity by Decreasing Temperature/Spontaneous Inter-Diffusion/Post-Treatment by UV Cross-Linking In another example, the following method is used to manufacture a three-dimensional transparent ophthalmic lens comprising the following steps:
1. constitute a first voxel of liquid composition (A) comprising a mixture of at least: a) an epoxy monomer and/or oligomer and b) a photo-initiator, in a state 1a; the first voxel is at a first temperature at deposition, which can be the result of a previous step: heating the composition prior to or at deposition;
2. cooling the deposited voxel, thereby increasing the viscosity of the voxel such that it sufficiently maintains its geometry during later steps;
3. repeating steps 1-2 with additional new voxels up to a desired amount;
4. inter-diffusing the plurality of deposited voxels, either spontaneously or induced, such as by thermal diffusion;
5. post-treating by cross-linking the plurality of inter-diffused voxels, such as with UV radiation, thereby curing the voxels and improving mechanical properties of the resulting element; UV radiation initiates the cationic photoinitiator for the epoxy-based composition.

Example 7: Increase Viscosity by Decreasing Temperature/Spontaneous Inter-Diffusion/Post-Treatment by UV Cross-Linking In another example, the following method is used to manufacture a three-dimensional transparent ophthalmic lens comprising the following steps:

1. constitute a first voxel of polymerizable, liquid composition comprising a mixture of at least: a) an acrylic monomer and/or oligomer (like CN962, a urethane acrylate from Sartomer), and b) a photo-initiator, preferably a blend of phenylbis(2,4,6-trimethylbenzoyl)-phosphine oxide and 2-hydroxy-2-methyl-1-phenyl-propane-1-one, free radical photoinitiators, in a state 1a; the first voxel is at a first temperature at deposition, which can be the result of a previous step: heating the composition prior to or at deposition to a viscosity as defined earlier for use in additive manufacturing;
2. cooling the deposited voxel, thereby increasing the viscosity of the voxel from 5 to 20 times the viscosity at deposition, such that it sufficiently maintains its geometry during later steps;
3. repeating steps 1-2 with additional new voxels up to a desired amount;
4. inter-diffusing the plurality of deposited voxels, either spontaneously or induced, such as by thermal diffusion;
5. post-treating by cross-linking the plurality of inter-diffused voxels, such as with UV radiation, thereby curing the voxels and improving mechanical properties of the resulting element; the UV radiation will initiate the free-radical photoinitiator for the acrylic-based composition.

Example 8: Increase Viscosity by Decreasing Temperature/Spontaneous Inter-Diffusion/Post-Treatment by UV Cross-Linking In another example, the following method is used to manufacture a three-dimensional transparent ophthalmic lens comprising the following steps:

1. constitute a first voxel of liquid composition (A) comprising a mixture of at least: a) an epoxy monomer and/or oligomer, (preferably a bisphenol A diepoxy); b) an acrylic monomer and/or oligomer, (preferably an aliphatic urethane acrylate); c) a cationic photo-initiator, (preferably a triarylsulfonium salt); and d) a free radical photoinitiator (preferably a blend of phenylbis(2,4,6-trimethylbenzoyl)-phosphine oxide and 2-hydroxy-2-methyl-1-phenylpropane-1-one, in a state 1a; the first voxel is at a first temperature at deposition, which can be the result of a previous step: heating the composition prior to or at deposition;
2. cooling the deposited voxel, thereby increasing the viscosity of the voxel from 5 to 20 times the viscosity at deposition, such that it sufficiently maintains its geometry during later steps;
3. repeating steps 1-2 with additional new voxels up to a desired amount;
4. inter-diffusing the plurality of deposited voxels, induced, such as by thermal diffusion;
5. post-treating by cross-linking the plurality of inter-diffused voxels, such as with UV radiation, thereby curing the voxels and improving mechanical properties of the resulting element; UV radiation initiates both the free-radical photoinitiator for the acrylic portion of the composition and the cationic photoinitiator for the epoxy portion of the composition.

Example 9: Increase Viscosity by Cross-Linking/Inter-Diffusion by Decrease of Molecular Mass Through Reversible Reaction/Post-Treatment by UV Cross-Linking In another embodiment of the invention corresponding to the <<Approach 2>>, the increase of viscosity is induced by cross-linking of reactive monomers/oligomers bearing in their backbone a molecular unit which can undergo reversible bond breaking, and the increase of mobility for voxel inter-diffusion is obtained by temporary/reversible decrease of molecular weight under a certain stimulus thanks to the reversible bond breaking unit present in the monomer/oligomer. The stimuli used for reversible bond breaking can be a source of heat (infrared irradiation, hot air convection, heat conduction, . . . ) or a source of light (UV light for example) depending on the nature of the chemical reaction.

In a preferred embodiment the cross-linking is obtained by photopolymerization and the bond breaking reaction is thermally reversible.

Monomers and/or oligomers for the liquid composition may be of the formula:

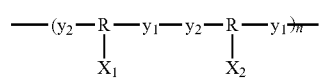

Wherein:

$X_1/X_2$ represent a polymerizable function, for example by light irradiation (photopolymerization), inducing cross-linking after the reaction of polymerization. Typical functions are (meth)acrylates, epoxides, vinyl, etc. . . . .

R is an organic group made of one or more carbon atoms, of aliphatic or aromatic nature, possibly containing heteroatoms like oxygen, sulphur, or nitrogen $y_1$ and $y_2$ are two organic groups (with or without heteroatoms) linked together by a reversible reaction, which can temporarily break them into Y1 and Y2 under a certain stimulus. The unit -$y_1$-$y_2$- can be made of reversible covalent bonds or supramolecular bonds.

The general principle of this example can be represented by the hereinbefore scheme 1:

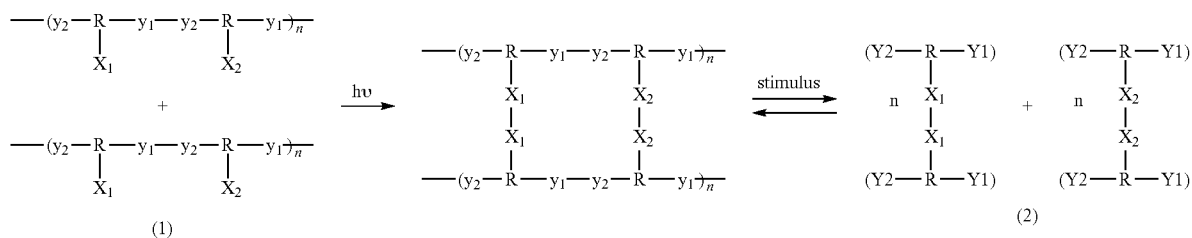

(1) → hv → (cross-linked) ⇌ stimulus ⇌ (2)

scheme 1: the increasing of viscosity of liquid composition comprising this kind of monomer and/or oligomer, is obtained by (1) Cross-linking, and the inter-diffusing step between voxel comprising said liquid composition, is obtained by (2) Reversible bond breaking.

Typical examples of reversible bond breaking molecular units are covalent bonds obtained by Diels-Alder reaction, supramolecular bonds like but not limited to hydrogen bonds, ionomers, metal-ligand systems, and π-π stacks.

Illustration of some reversible bond breaking molecular units, for covalent bonds, is illustrated hereinbelow:

Cyclo-addition by Diels-Alder/retro-Diels-Alder reaction

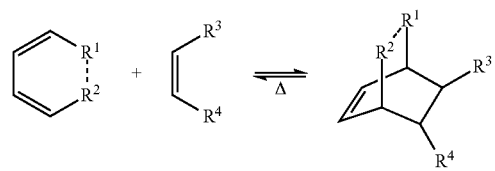

This reversible reaction is illustrated below on two families of molecules, respectively furan-maleimide and anthracene:

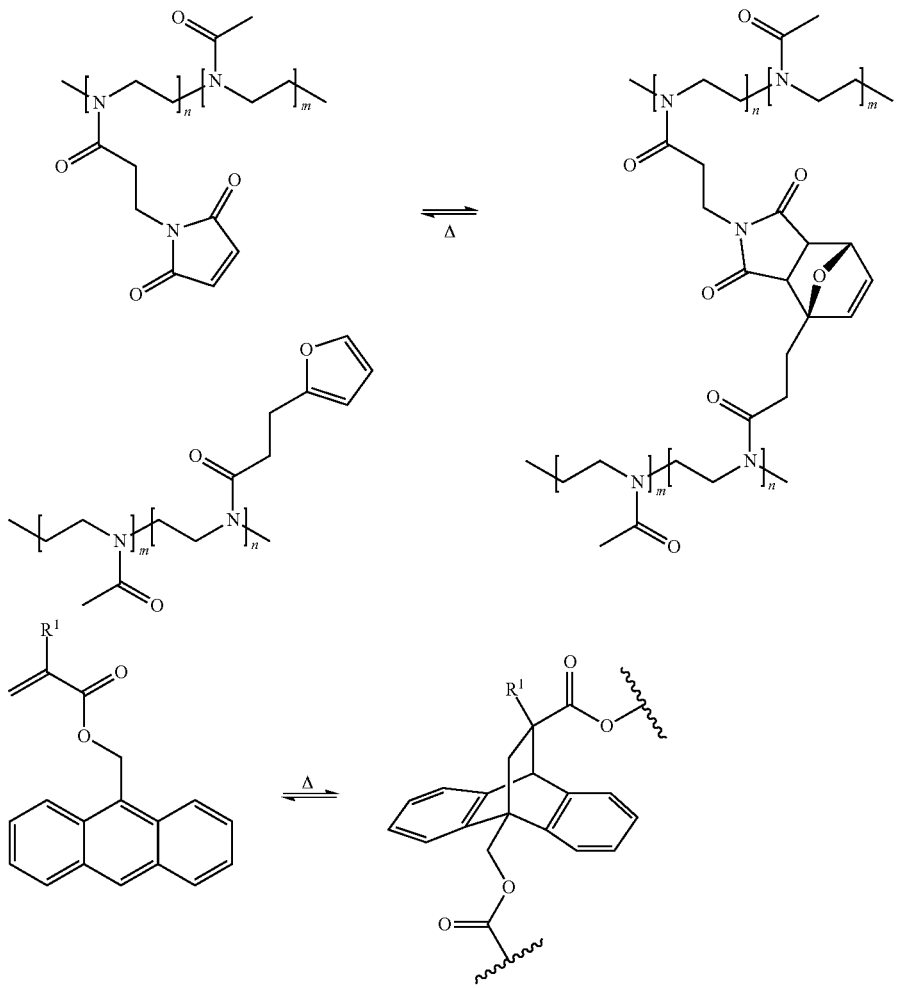

Hydrogen bonds: Hydrogen bonds are illustrated, as example, on two families of molecules, respectively between 2 ureido pyrimidone molecules, and polystyrene grafted with acrylate:

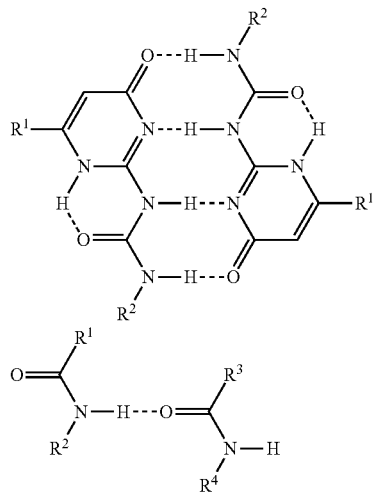

Example 10: Increase Viscosity by Cross-Linking/Spontaneous Inter-Diffusion/Post-Treatment by UV Cross-Linking In another example, the following method is used to manufacture a three-dimensional transparent ophthalmic lens comprising the following steps:

1. constituting a first voxel of liquid composition (A) at a state 1a, comprising a mixture of at least: a) an acrylic monomer and/or oligomer, preferably a mixture of di-, tri-, tetra-, and urethane acrylates and more preferably a mixture of 1,4 butanediol diacrylate, pentaerythritol triacrylate, and CN-975 urethane hexafunctional acrylate; and b) a photoinitiator, preferably a mixture of phenylbis(2,4,6-trimethylbenzoyl)-phosphine oxide and 2-hydroxy-2-methyl-1-phenyl-propane-1-one, free radical photoinitiators;

2. exposing the first voxel to UV radiation, thereby: a) partially cross-linking the acrylic composition and increasing the viscosity of the first voxel to a state 2a; with sufficient viscosity to substantially maintain its geometry during later steps;

3. constituting, adjacent with the previous voxel, a new voxel of the same liquid composition (A), at a state 1a.

4. Inter-diffusing the first voxel (in State 2a) with the new voxel (in state 1a), namely by inter-diffusing the (uncured) portion of the (partially cured) acrylic composition of the first voxel with the acrylic of the new voxel;

5. Submitting the first and new voxels to UV radiation and polymerizing to a further degree the first voxel and partially crosslinking the new voxel, thereby crosslinking the (already-diffused) acrylic components of the first and new voxels; the second voxel is in a State 2a, that is, partially cured and with an increased viscosity; the first voxel is now in a State 3a, closer to being fully polymerized; the first and new voxels are now merged into a single, polymerized intermediate element n, 6. repeating steps 1 to 5 with additional voxels up to a desired amount;

7. optionally, applying one or more post-treatments, such as photopolymerization, thereby completing the polymerization of the ophthalmic lens.

Example 11: Increasing Viscosity by Decrease Temperature/Spontaneous Interdiffusion/Post-Treatment by Cross-Linking In another example, the following method is used to manufacture a three-dimensional transparent ophthalmic lens comprising the following steps:

1. constituting a first voxel of liquid composition (A) of low viscosity thermoplastic composition in a state 1a comprising at least: a) a thermoplastic polymer; the first voxel is at a first temperature at deposition, which can be the result of a previous step: heating the composition prior to or at deposition;

2. cooling the deposited voxel to a state 2a, thereby increasing the viscosity of the voxel such that it sufficiently maintains its geometry during later steps;

3. constituting, adjacent with the first voxel, a new voxel in a state 1b comprised at least a) an acrylic monomer and/or oligomer, and b) a photo-initiator;

4. Inter-diffusion of the first voxel and the new voxel is a spontaneous diffusion of uncured acrylic monomer and/or oligomer into the outer surface of the thermoplastic, to create an intermediate element;

5. Step 1 is then repeated, depositing a new voxel of the same thermoplastic composition (A) onto the second acrylic voxel.

6. Submitting said voxels to post-treatment by UV radiation, cures the acrylic, which is inter-diffused into the surfaces of the two thermoplastic voxels and bonds the first and third voxels together.

7. Repeating steps 1 to 5, until a desired number of voxels have been deposited; for example, repetition can be stopped after deposition of immediately adjacent voxels or after deposition of an entire layer.

8. Submitting the voxels to UV cure should only take place after deposition of the thermoplastic to ensure inter-diffusion of the acrylic and thermoplastic compositions.

9. Optionally, radiating the plurality of diffused voxels, such as with UV radiation, thereby curing the voxels and improving mechanical properties of the resulting element; UV radiation will initiate the free radical initiator of the acrylic composition which is inter-diffused with the thermoplastic.

Example 12: Alternating UV Cross-Linking

In another example, the following method is used to manufacture a three-dimensional transparent ophthalmic lens comprising the following steps:

1. constituting a first voxel of a liquid composition (A), at a state 1a, comprising a mixture of at least: a) an epoxy aliphatic monomer and/or oligomer, or an epoxy silane monomer and/or oligomer; b) an acrylic monomer and/or oligomer; c) a cationic photoinitiator; and d) a free radical photoinitiator; The composition preferably consists of multi-epoxy functional glycidyl ethers and a combination of di-, tri- and tetra-functional acrylates and more preferably consists of a mixture of trimethylolpropane triglycidyl ether, sorbital polyglycidyl ether, 1,4 butanediol diacrylate, pentaerythritol triacrylate, with triaryl sulfonium hexafluoroantimonate cationic photoinitiator and the free radical photoinitiator is preferably 2-benzyl-2-N,N,-dimethylamino-1-(4-morpholinophenyl)-1-butanone (DBMP).

2. increasing the viscosity of the first voxel, to a state 2a, by exposing the first voxel to UV radiation that initiates the cationic photoinitiator, thereby cross-linking the epoxy component while leaving uncured the acrylic component of the first voxel; the first voxel is in a partially cured state (cured epoxy, uncured acrylic);

3. constituting adjacent with the first voxel, a new voxel of the same liquid composition (A), at a state 1a.

4. inter-diffusing the first voxel (in state 2a) and the new voxel (in State 1a), namely by inter-diffusing the (uncured) acrylic component of the first voxel with the acrylic component of the second voxel; the inter-diffusion may be spontaneous;

5. submitting the first and new voxels to UV radiation that initiates the free radical photoinitiator thus curing the acrylic component of the first voxel and the acrylic component of the new voxel, thereby cross-linking the (already inter-diffused) acrylic components of the first and second voxels; the epoxy component of the second voxel remains uncured such that the new voxel is now in a State 2a, that is, partially cured and with an increased viscosity; the first voxel is now in a State 3a, that is, fully cured; the first and new voxels are now merged into a single, polymerizable unit, having cured acrylic and a mixture of cured and uncured epoxy;

6. repeating steps 1 to 5, depositing voxels of the same composition and alternating cure of the epoxy and acrylic components of the composition, and forming sequentially larger merged members until obtaining the three-dimensional ophthalmic lens; and 7. optionally, and preferably applying one or more post-treatments, such as preferentially photo-polymerization, thereby completing the polymerization and the homogenization of the ophthalmic lens.

As will be understood by those skilled in the art, the alternating exposure of voxels to UV radiation requires alternating the type of UV radiation depending on the absorption spectra of the cationic and free radical photoinitiator(s) chosen. For example, UV radiation of a first intensity and frequency is used to cure the epoxy components, while UV radiation of a second intensity and frequency is used to cure the acrylic components.

In this example, the liquid composition is a hybrid of epoxy and acrylic containing a free radical photoinitiator to initiate cure of the acrylic component(s) and containing a cationic photoinitiator to initiate the epoxy component(s) such that the free radical photoinitiator requires UV radiation of one intensity and frequency and the cationic photo-initiator requires UV radiation of a different intensity and frequency.

Example 13: Increase Viscosity by Evaporation/Inter-Diffusion by Heat Treatment/Post-Treatment by UV Cross-Linking—Thermoplastic Functionalized with Epoxy In another example, the following method is used to manufacture a three-dimensional transparent ophthalmic lens comprising the following steps:

1. constituting a first voxel of thermoplastic composition (A) comprising at least: a) a thermoplastic polymer that has at least one epoxy bearing pendant group, preferably epoxy/polymethylmethacrylate (epoxy/PMMA) and more preferably diglycidyl ether of bisphenol A impregnated into polymethylmethacrylate to form the epoxy/PMMA, b) a solvent (preferentially dichloromethane, anisole, MIBK, or ethyl lactate and more preferably anisole or ethyl lactate, c) and a cationic photo-initiator, preferably a triarylsulfonium metal salt and more preferably triarylsulfonium hexafluorophosphate, in a state 1a;

2. increasing viscosity by flashing off by evaporation, a sufficient amount of the solvent, resulting in a stable first voxel, in a state 2a, with viscosity between 5 times to 20 times the viscosity in state 1a, to substantially maintain its geometry during later steps;

3. repeating steps 1-2 with additional voxels up to a desired amount;

4. inter-diffusing the plurality of deposited voxels, induced such as by thermal diffusion;

5. post-treatment by cross-linking the plurality of diffused voxels, such as with UV radiation, thereby curing the voxels and improving mechanical properties of the resulting ophthalmic lens; UV radiation will initiate the cationic photo-initiator for an epoxy-based composition.

Example 14: Increase Viscosity by Evaporation/Inter-Diffusion by Heat Treatment/Post-Treatment by UV Cross-Linking—Thermoplastic Functionalized with Acrylic In another example, the following method is used to manufacture a three-dimensional transparent ophthalmic lens comprising the following steps:

1—constituting a first voxel of low viscosity thermoplastic composition (A) comprising at least: a) a thermoplastic polymer that has at least one (meth)acrylate bearing pendant group, preferably (meth)acrylate/polymethylmethacrylate ((meth)acrylate/PMMA) and more preferably diethyleneglycoldi(meth)acrylate impregnated into polymethylmethacrylate to form the (meth)acrylate/PMMA, b) a solvent (preferentially dichloromethane, anisole, MIBK, or ethyl lactate and more preferably anisole or ethyl lactate, c) and a free-radical photo-initiator, preferably phenylbis(2,4,6-trimethylbenzoyl)-phosphine oxide and more preferably a mixture of phenylbis(2,4,6, trimethylbenzoyl)-phosphine oxide and 2-hydroxy-2-methyl-1-phenylpropane-1-one, in a State 1;

2—increasing viscosity by flashing off by evaporation, a sufficient amount of the solvent, resulting in a stable first voxel, in a state 2a, with viscosity between 5 times to 20 times the viscosity in state 1a, to substantially maintain its geometry during later steps;

3—repeating steps 1-2 with additional new voxels up to a desired amount;

4—inter-diffusing the plurality of deposited voxels, either spontaneously or induced, such as by thermal diffusion;

5—post-treatment by cross-linking the plurality of diffused voxels, such as with UV radiation, thereby curing the voxels and improving mechanical properties of the resulting ophthalmic lens; UV radiation will initiate the cationic photo-initiator for an epoxy-based composition.

Therefore, the present invention is well adapted to attain the ends and advantages mentioned as well as those that are inherent therein.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed:

1. A method of manufacturing a three-dimensional transparent ophthalmic lens comprising the following steps:
    /1/ constituting at least a voxel of a liquid composition (A) in a state 1a;
    /2/ constituting at least a voxel of a liquid composition (B) in a state 1b;
    /3/ increasing viscosity of at least a said constituted voxel to reach it from a state 1 to a state 2;
    /4/ inter-diffusing through a physical and/or a chemical treatment, at least a voxel wherein viscosity is increased, either of a composition (A) to a state 2a or a composition (B) to a state 2b, with another voxel either of a composition (A) in a state 1a or 2a, or of a composition (B) in a state 1b or 2b, to create an intermediate element (n); and
    /5/ repeating, (X) times, with (X) being an integer, at least one of the step selected from /1/, /2/, /3/ and /4/ to form an intermediate element (n+(X)) until a three-dimensional transparent ophthalmic lens is obtained, and when at least two steps from said steps are repeated, said at least two steps are repeated in the same order as cited or in a different order according to chemical compound(s) involved to said liquid composition (A) and said liquid composition (B).

2. The method according to claim 1 comprising the following steps:
    /1/ constituting a first voxel of a liquid composition (A) in a state 1a;
    /2/ constituting a new voxel, adjacent to said first voxel, of a liquid composition (B) to a state 1b;
    /3/ increasing viscosity of said first voxel and said new voxel to reach them respectively to a state 2a and to a state 2b;
    /4/ inter-diffusing said first voxel and said new voxel, by submitting them to a physical and/or chemical treatment, to create an intermediate element (n) in a state 3 by merging the two voxels; and
    /5/ repeating, (X) times, with (X) being an integer, steps /2/ to /4/ respectively by applying said steps "increasing viscosity" and "inter-diffusing" to each new voxel and to intermediate element to form a intermediate element (n+(X)) until a three-dimensional transparent ophthalmic lens is obtained.

3. The method of claim 1, wherein:
    step /3/ is performed between steps /1/ and /2/ and is then applied to the first voxel of a liquid composition (A) in a state 1a; and comprising further a step /3A/ increasing viscosity after step /4/ and applying to intermediate element which is the result of step /4/.

4. The method of claim 1, wherein liquid composition (A) and liquid composition (B) are identical.

5. The method of claim 1, wherein liquid composition (A) and liquid composition (B) are different.

6. The method of claim 1, wherein each new voxel comprises the liquid composition (A) or liquid composition (B), or the liquid composition (A) then a liquid composition (B).

7. The method of claim 1, wherein during step /5/, each new voxel comprises liquid composition (A) and a liquid composition (B), and wherein liquid composition (A) and liquid composition (B) are different.

8. The method of claim 1, wherein during step /5/ each new voxel comprises a liquid composition (A), and wherein liquid composition (A) in the step /1/ and liquid composition (B) in the step /2/ are identical.

9. The method of claim 1, wherein the step(s) of increasing viscosity are selected from the group consisting of:
    a crosslinking process, which could be initiate by cationic reaction, by free radical reaction or by condensation reaction by applying activating light or thermal treatment to liquid composition;
    an evaporation process, and more particularly evaporation of solvent comprised into liquid composition; and
    a process consisting to submit liquid composition to a temperature which is below the temperature used at the deposition step of the voxel.

10. The method according to claim 9, wherein each step of increasing viscosity is identical or different.

11. The method of claim 1, wherein the inter-diffusing step(s) are selected from:
    spontaneous inter-diffusion; and
    induced inter-diffusion, which represent a process selected from the group consisting of exposure to radiation, mechanical agitation, decrease of molecular mass of voxel, and exposure to a solvent.

12. The method according to claim 11 wherein each step of inter-diffusing is identical or different.

13. The method of claim 1, further comprising:
    post-treatment step(s) selected from the group consisting of:
    a crosslinking process, which is initiated by cationic reaction, by free radical reaction or by condensation reaction by applying activating light or thermal treatment to the liquid composition;
    an annealing process; and
    a drying process by thermal treatment or solvent extraction.

14. The method according to claim 13 wherein each step of post-treatment is identical or different.

15. The method according claim 1, wherein:
    the step of increasing the viscosity increases the initial viscosity of the liquid composition from 5 times to 20 times, the final viscosity of the ophthalmic lens manufactured by said method being more than 50 000 cPs at 25° C.

16. The method of claim 1, wherein the step of increasing viscosity is by a cross-linking process that represents a photo-polymerization or a thermal-polymerization process wherein the liquid composition comprises:
    at least a monomer and/or oligomer comprising at least a reactive group selected from epoxy, thioepoxy, epoxysilane, (meth)acrylate, vinyl, urethane, thiourethane, isocyanate, mercapto, and alcohol; and at least an initiator activated by activating light or activating temperature, said initiator being selected from cationic initiator and free-radical initiator; and wherein activated initiator initiates activation of at least one reactive group from monomer and/or oligomer to generate their polymerization reaction via propagation process.

17. The method of claim 1, wherein the liquid composition (A) and (B) comprises:

at least a mixture of two monomers and/or oligomers each comprising different reactive groups wherein at least a reactive group of the first monomer and/or oligomer increases viscosity by a photo-polymerization process and a reactive group of the second monomer increases viscosity by a photo-polymerization process or by a thermal-polymerization process; and at least a mixture of two initiators, the first initiator activating the at least a reactive group of said first monomer by treatment of activating light, the second initiator activating the at least a reactive group of said second monomer by thermal treatment or by activating light treatment which is different than previous activating light.

18. The method of claim 1, wherein steps of constituting voxels comprises a step of constituting alternatively voxels based of two different liquid compositions (A) and (B):

a liquid composition (A) comprising at least a monomer and/or oligomer with two families of reactive groups, one family being activated by photo-polymerization in the presence of a photo-initiator;

a liquid composition (B) comprising at least same monomer and/or oligomer of said first composition and an initiator which is different than said first photo-initiator and is activated by photo-polymerization or by thermal-polymerization.

19. The method according to claim 18, wherein said liquid composition (B) comprises a photo-initiator activated by photo-polymerization said photo-initiator being:

either a cationic initiator which is activatable by irradiation to a different wavelength and/or intensity of activating light than activating light used to activate the initiator of the liquid composition (A);

or a free-radical initiator.

20. The method according to claim 19, wherein said photo-initiator is a free-radical initiator.

21. The method of claim 1, wherein:

the step of constituting a voxel comprises utilizing a liquid composition comprising at least of a monomer and/or oligomer comprising at least a reactive group selected from epoxy, thioepoxy, (meth)acrylic, and (meth)acrylate, at least a cationic initiator or a free-radical initiator, and a solvent or mixture of solvent; and the step of increasing the viscosity comprises an evaporation process after each step of constituting a voxel of liquid composition to create stable voxels.

22. The method of claim 1, wherein:

the step of constituting a voxel comprises utilizing a liquid composition comprising at least a thermoplastic polymer dissolved in a solvent; and the step of increasing the viscosity comprises an evaporation process after each step of constituting a voxel of liquid composition to create stable voxels.

23. The method of claim 1, comprising:

a—a step of constituting a first voxel wherein the liquid composition (A) represents a thermoplastic polymer dissolved in a solvent in a state 1a;

b—a step of increasing viscosity by an evaporation process to end-up said voxel as a stable voxel of liquid composition (A) to a state 2a;

c—a step of constituting a new adjacent voxel of a liquid composition (B), identical to said liquid composition (A), to a state 1b;

d—a step of inter-diffusing by spontaneous diffusion of said new voxel to said first voxel, to create an intermediate element (n);

e—a step of increasing viscosity by an evaporation process to end-up said intermediate element (n) as a stable element;

f—a step of repeating X times, with X being an integer, steps b to e, until the constitution of an intermediate element (n+(X));

g—a post-treatment step, comprising heating by convection or using infra-red irradiation, being applied to enhance homogenization inside said intermediate element (n+(X)) and to produce a three-dimensional transparent ophthalmic lens.

24. The method of claim 1, comprising the following steps:

constituting a first voxel of liquid composition (A) comprising a mixture of at least: a) an epoxy or thioepoxy monomer and/or oligomer, or an acrylic or (meth) acrylic monomer and/or oligomer, b) a solvent or mixture of solvent c) and a photo-initiator selected from cationic initiator for epoxy or thioepoxy monomer and/or oligomer, and from free-radical initiator for acrylic and (meth)acrylic monomer and/or oligomer, in a state 1a;

increasing the viscosity by evaporating a sufficient amount of the solvent, resulting in a stable first voxel, in a state 2a and to substantially maintain its geometry during later steps;

repeating x times with x being an integer, the two first preceding steps with new voxels up to a desired amount;

inter-diffusing the plurality of deposited voxels either by a spontaneous interdiffusion or by a thermal diffusion process by heat convection or infra-red radiation up to constitute an intermediate element (n+x) which represents part of the transparent ophthalmic lens;

repeating (X−x) times all preceding steps with new voxels up to constitute of an intermediate element (n+(X));

applying a post-treatment process by UV activating light to cure said intermediate elements to obtain the three-dimensional transparent ophthalmic lens.

25. The method according to claim 1, wherein the three-dimensional ophthalmic lens is manufactured by an additive manufacturing technology selected from stereolithography, mask stereolithography, mask projection stereolithography, polymer jetting, and fused deposition modeling.

26. The method according to claim 1, further comprising:

adding at least a functional coating and/or a functional film, on at least one face of the ophthalmic lens.

27. The method according to claim 26 wherein the functionality of said coating and/or said film is selected from the group consisting of anti-impact, anti-abrasion, anti-soiling, anti-static, anti-reflective, anti-fog, anti-rain, self-healing, polarization, tint, photochromic, and selective wavelength filter which could be obtained through an absorption filter or reflective filter.

28. The method according to claim 26 wherein the functionality is added by at least one process selected from dip-coating, spin-coating, spray-coating, vacuum deposition, transfer process or lamination process.

29. The method according to claim 1, wherein the three-dimensional transparent ophthalmic lens is selected from a blank lens, semi-finished lens, and finished lens.

30. The method according to claim 1, wherein the three-dimensional transparent ophthalmic lens is selected from the afocal, unifocal, bifocal, trifocal, and progressive lens, said ophthalmic lens being able to be mounted either to traditional frame comprising two distinctive ophthalmic lenses, one for the right eye and one for the left eye, or to mask, visor, helmet sight or goggle, wherein one ophthalmic lens facing simultaneously the right and the left eyes, and said ophthalmic lens is produced with traditional geometry as a circle or e is produced to be fitted to the geometry to the frame intended.

31. A three-dimensional transparent ophthalmic lens obtained from the method of claim 1.

* * * * *